US011574082B1

(12) United States Patent
Lu et al.

(10) Patent No.: US 11,574,082 B1
(45) Date of Patent: Feb. 7, 2023

(54) PARTIAL SIMULATION MODEL CREATION, SIMULATION AND POST-PROCESSING FOR ROTATIONAL MACHINES

(71) Applicant: Ansys, Inc., Canonsburg, PA (US)

(72) Inventors: Chuan Lu, Bridgeville, PA (US); Qijin Liu, Wexford, PA (US); Ping Zhou, Bethel Park, PA (US)

(73) Assignee: Ansys, Inc., Canonsburg, PA (US)

( * ) Notice: Subject to any disclaimer, the term of this patent is extended or adjusted under 35 U.S.C. 154(b) by 139 days.

(21) Appl. No.: 16/890,335

(22) Filed: Jun. 2, 2020

Related U.S. Application Data

(60) Provisional application No. 62/954,382, filed on Dec. 27, 2019.

(51) Int. Cl.
*G06F 30/10* (2020.01)
*G06F 30/23* (2020.01)
(Continued)

(52) U.S. Cl.
CPC .............. *G06F 30/10* (2020.01); *G06F 30/23* (2020.01); *G06T 17/20* (2013.01); *H02K 1/27* (2013.01); *G06F 2111/10* (2020.01)

(58) Field of Classification Search
CPC ...... G06F 30/10; G06F 30/23; G06F 2111/10; G06T 17/20; G01R 31/343; H02K 1/27
See application file for complete search history.

(56) References Cited

U.S. PATENT DOCUMENTS

| 6,434,491 B1 * | 8/2002 | Miyata | G01R 31/343 |
| | | | 702/38 |
| 7,394,463 B2 * | 7/2008 | Tani | G06T 17/20 |
| | | | 345/420 |

(Continued)

FOREIGN PATENT DOCUMENTS

| CN | 1404215 A | * | 3/2003 |
| CN | 105589996 A | * | 5/2016 |

(Continued)

OTHER PUBLICATIONS

Ari, Ismail, and Nitel Muhtaroglu. "Design and implementation of a cloud computing service for finite element analysis." (Elsevier Ltd, 2013) Advances in Engineering Software 60 : 122-135. https://doi.org/10.1016/j.advengsoft.2012.10.003 (Year: 2013).*

(Continued)

*Primary Examiner* — Rehana Perveen
*Assistant Examiner* — Daniel E Miller
(74) *Attorney, Agent, or Firm* — Jones Day

(57) ABSTRACT

Data is received that comprises a full model for a physical object having a rotating part and a stationary part. The physical object includes fields coupled between the rotating part and the stationary part. A mesh is then generated for a portion of the physical object that includes a rotating mesh and a stationary mesh. Thereafter, a partial simulation model is created based on the full model and the mesh. Coupling relationships are established for the fields between the rotating mesh and the stationary mesh in the partial simulation model. The fields are then solved based on the coupling relationship of the partial simulation model. Thereafter, fields of the full model can be recovered based on the solved fields. Related apparatus, systems, techniques and articles are also described.

20 Claims, 23 Drawing Sheets

(51) Int. Cl.
    *G06T 17/20*     (2006.01)
    *H02K 1/27*     (2022.01)
    *G06F 111/10*     (2020.01)

(56) References Cited

U.S. PATENT DOCUMENTS

| | | | |
|---|---|---|---|
| 10,282,198 B2 | 5/2019 | Lowry et al. | |
| 2005/0055183 A1* | 3/2005 | Tani | G06T 17/30 703/2 |

FOREIGN PATENT DOCUMENTS

| | | | | |
|---|---|---|---|---|
| CN | 108595772 | A | * | 9/2018 |
| JP | 2003186920 | A | * | 7/2003 |
| JP | 2005258839 | A | * | 9/2005 |

OTHER PUBLICATIONS

Stoev, Bozhidar, George Todorov, Plamen Rizov, Gerasimos Pagiatakis, and Leonidas Dritsas. "Finite element analysis of rotating electrical machines—an educational approach." (IEEE, 2017) in 2017 IEEE Global Engineering Education Conference (EDUCON), pp. 262-269. DOI: 10.1109/EDUCON.2017.7942857 (Year: 2017).*
Nyitrai, Attila, Gergely Szabó, Saóndor Horváth, and István Vajda. "Multiphysics Analysis of Automotive PMaSynRM." (IEEE, 2019) in 2019 International IEEE Conference and Workshop in Óbuda on Electrical and Power Engineering (CANDO-EPE), pp. 67-72. DOI: 10.1109/CANDO-EPE47959.2019.9111009 (Nov. 2019) (Year: 2019).*
Vanoost, Dries, Herbert De Gersem, Joan Peuteman, Georges Gielen, and Davy Pissoort. "Two-dimensional magnetostatic finite-element simulation for devices with a radial symmetry." (IEEE, 2013) IEEE transactions on magnetics 50, No. 5: 1-4. DOI: 10.1109/TMAG. 2013.2292672 (Year: 2013).*
Fouad, Fakhry A., T. W. Nehl, and N. A. Demerdash. "Magnetic field modeling of permanent magnet type electronically operated synchronous machines using finite elements." (IEEE, 1981) IEEE Transactions on Power Apparatus and Systems, vol. PAS-100, No. 9, pp. 4125-4135. doi: 10.1109/TPAS.1981.316957. (Year: 1981).*
Arkkio, A., Analysis of induction motors based on the numerical solution of the magnetic field and circuit equations. (Helsinki, 1987) Acta Polytechnica Scandinavica, Electrical Engineering Series No. 59. pp. 1-27, 54-58, 95-97 ISBN 951-666-250-1. (Year: 1987).*
Gumaste, Udayan Anand. "Euler flow computations on non-matching unstructured meshes". PhD diss. (University of Colorado at Boulder, 1998). UMI 9827716 <https://core.ac.uk/download/pdf/42767884.pdf> (Year: 1998).*
Fu, Weinong. "Electromagnetic field analysis of induction motors by finite element method and its application to phantom loading." PhD diss., (Hong Kong Polytechnic University, 1999). <https://theses.lib.polyu.edu.hk/handle/200/1266> (Year: 1999).*
Fu, W. N., and Siu Lau Ho. "Elimination of nonphysical solutions and implementation of adaptive step size algorithm in time-stepping finite-element method for magnetic field-circuit-motion coupled problems." (IEEE, 2009) IEEE transactions on magnetics 46, No. 1: 29-38. (Year: 2009).*
Allen, N., H. C. Lai, P. J. Leonard, and D. Rodger. "External circuit, movement, and periodicity considerations in the design of electrical machines using finite elements." (IET Digital Library, 1995) Seventh International Conference on Electrical Machines and Drives. pp. 126-130. 10.1049/cp:19950848 (Year: 1995).*
Niu, Shuangxia, Siu Lau Ho, W. N. Fu, and Jianguo Zhu. "A convenient mesh rotation method of finite element analysis using sub-matrix transformation approach." (IEEE, 2012) IEEE transactions on magnetics 48, No. 2: 303-306. 10.1109/TMAG.2011. 2173913 (Year: 2012).*
Lin, D., Zhou, P. Chen, N., Lu, C., Christini, M.; Fast Methods for Reaching AC Steady State in FE Transient Analysis; 2017 IEEE International Electric Machines and Drives Conference; Miami, FL; May 2017.

* cited by examiner

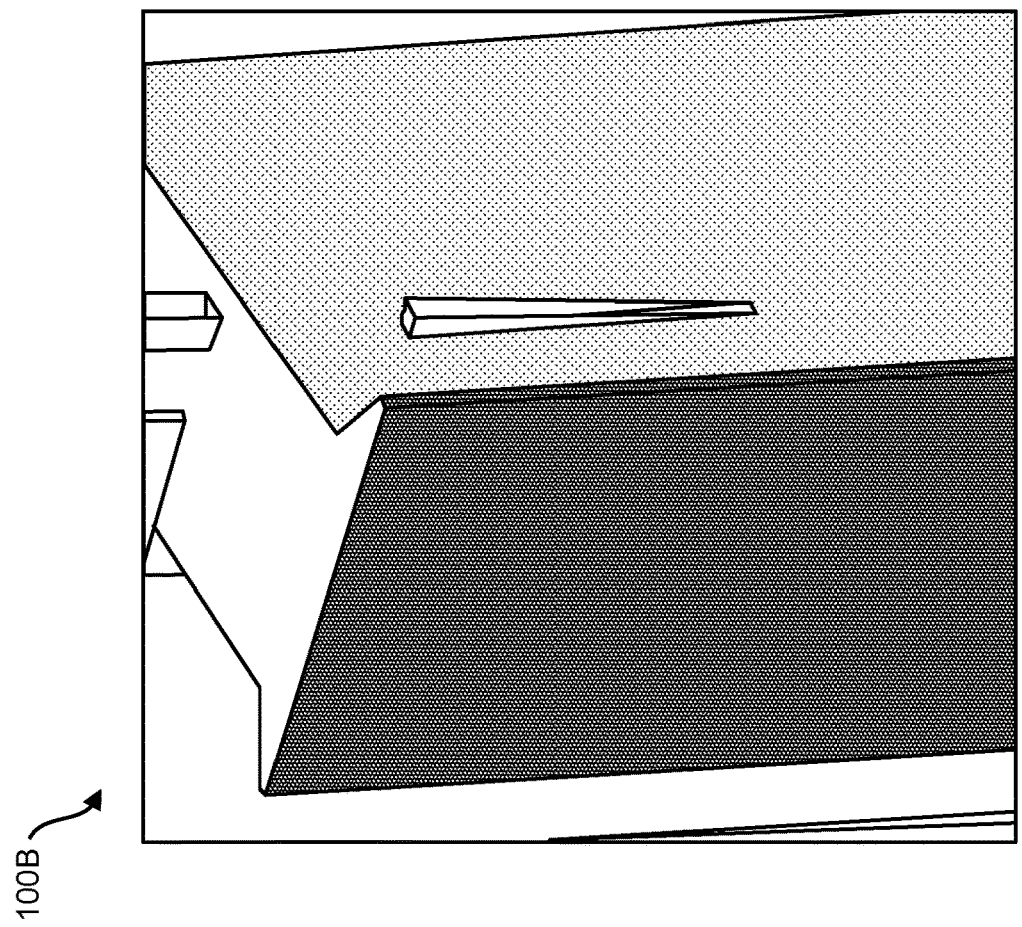
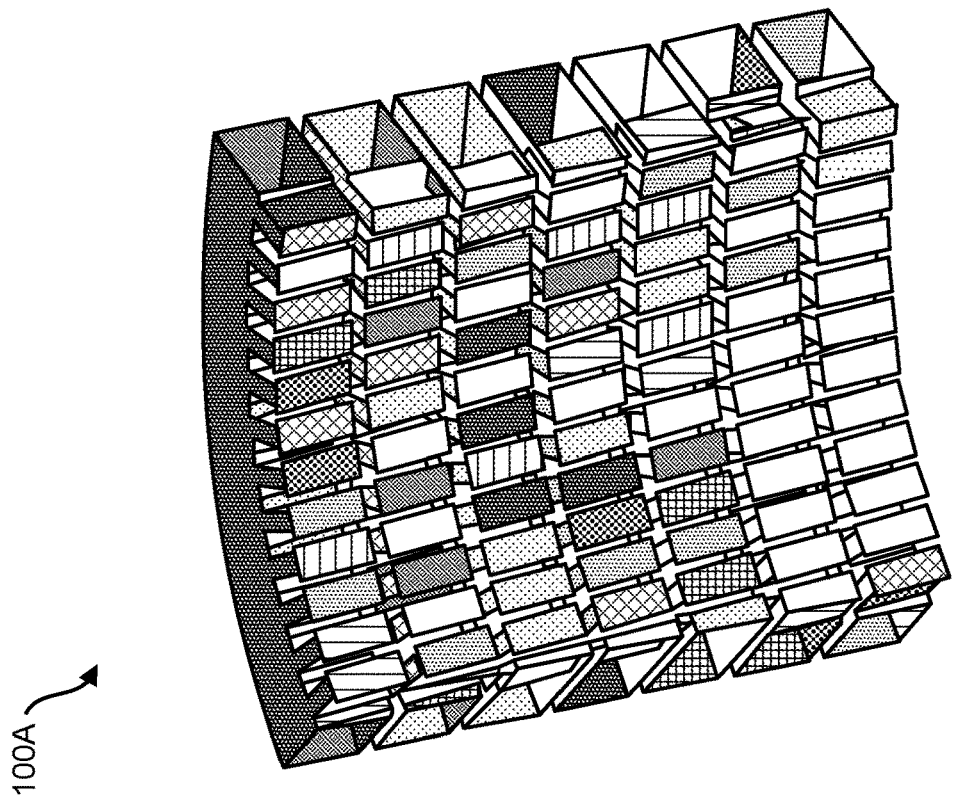
FIG. 1
PRIOR ART

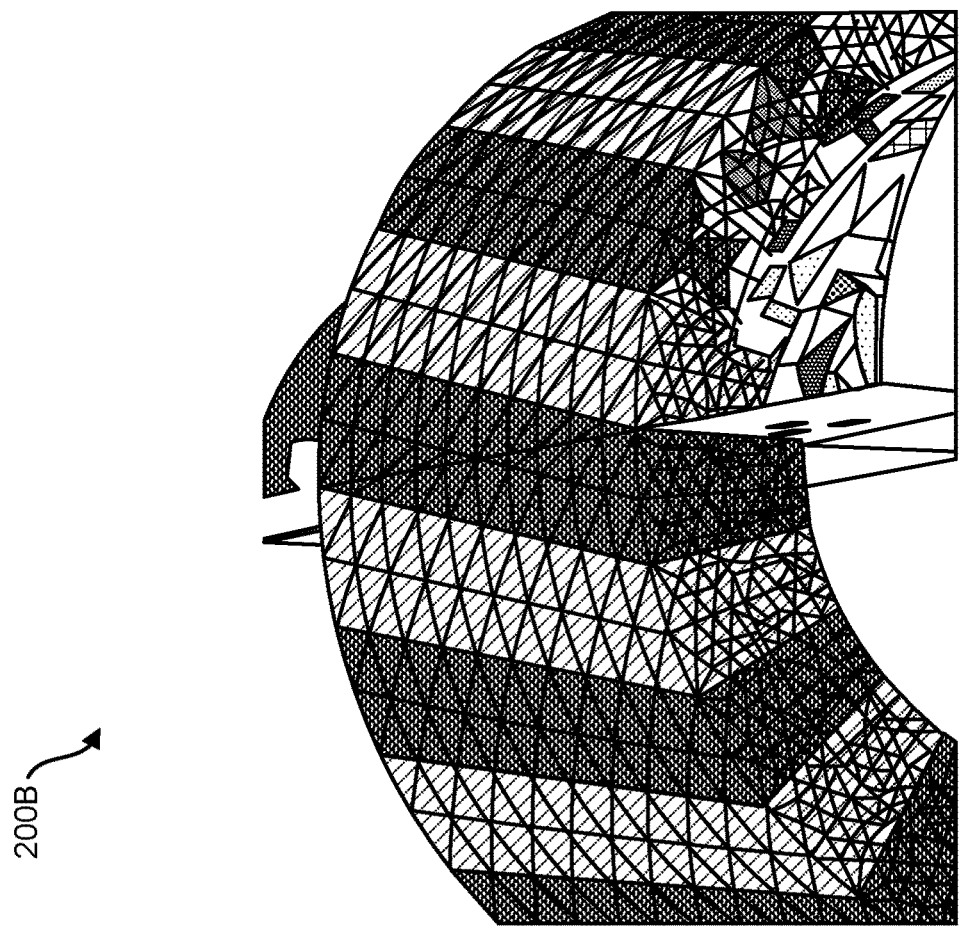
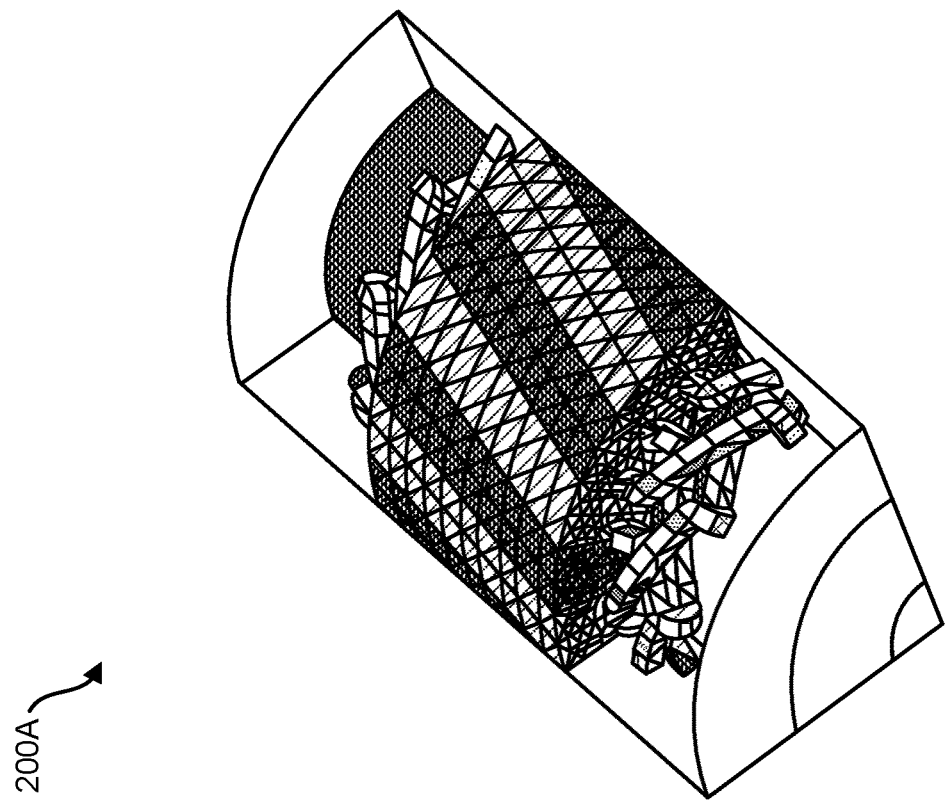
FIG. 2
PRIOR ART

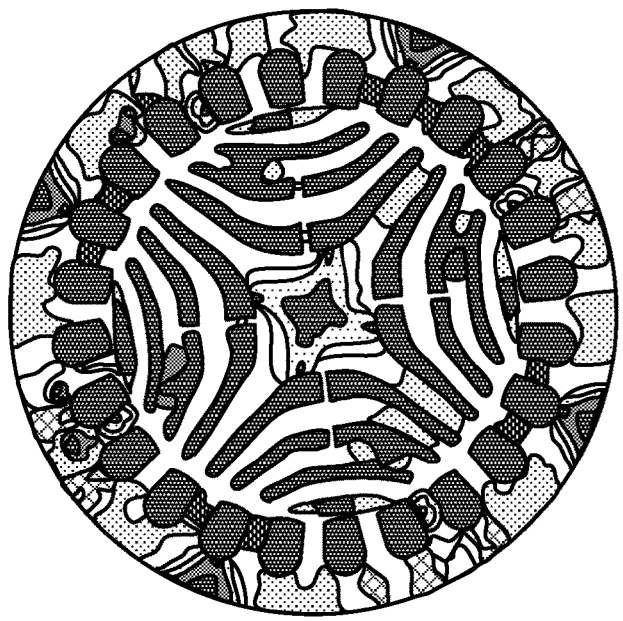
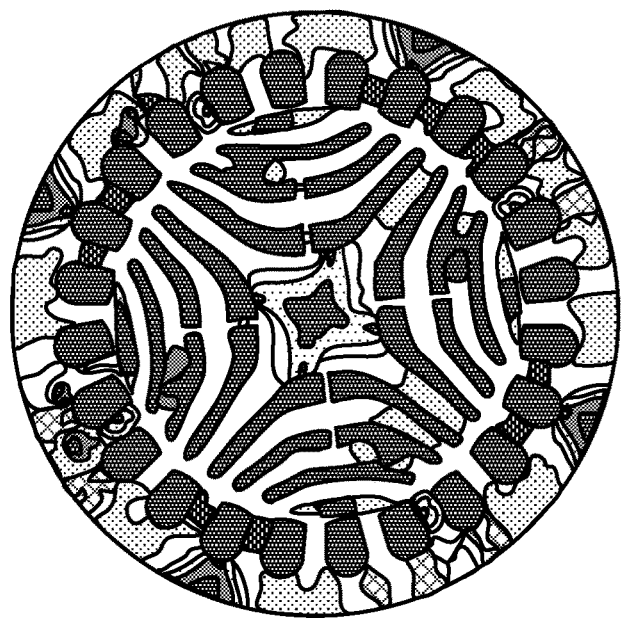
FIG. 20

PARTIAL SIMULATION MODEL CREATION, SIMULATION AND POST-PROCESSING FOR ROTATIONAL MACHINES

CROSS-REFERENCE TO RELATED APPLICATIONS

This application claims priority to U.S. Provisional Application No. 62/954,382, filed Dec. 27, 2019, entitled "Systems and Methods for Auto-Partial Model Creation, Simulation and Post-Processing for Rotational Machines," the entirety of which is incorporated herein by reference.

TECHNICAL FIELD

The subject matter described herein relates to enhanced techniques for modeling rotational machines.

BACKGROUND

Transient finite element analysis (FEA) coupled with driven circuits is a useful design tool for electrical machine design as it takes into account geometric complexity, high local magnetic saturation, induced eddy currents, dynamic core loss and mechanical movement with a desirable accuracy. However, the transient numerical field simulation for electrical machines normally involves many time steps to calculate saturation, eddy currents, slotting effects and rotor movement in time and space. As a result, modeling an electric machine requires a huge amount of computational undertaking, especially in three dimensions.

SUMMARY

In a first aspect, data is received that comprises a full model for a physical object having a rotating part and a stationary part. The physical object includes fields coupled between the rotating part and the stationary part. A mesh is then generated for a portion of the physical object that includes a rotating mesh and a stationary mesh. Thereafter, a partial simulation model is created based on the full model and the mesh. Coupling relationships are established for the fields between the rotating mesh and the stationary mesh in the partial simulation model. The fields are then solved based on the coupling relationship of the partial simulation model. Thereafter, the fields of the full model can be recovered based on the solved fields.

The mesh can be a partial mesh. The partial mesh can include non-planar matching boundaries. The full model can include a periodic portion and the partial simulation model can be create by identifying two dimensional and three dimensional objects in the periodic portion in the full model. Such objects can, for example, represent winding elements in the partial simulation model.

The partial simulation model can be modified to decouple the rotating mesh and the stationary mesh prior to establishing of the coupling relationships for the fields. With such an arrangement, the coupling relationships can be established based on the modified partial simulation model.

Force, torque, and loss can be calculated on the partial simulation model with a non-planar matching boundary. The calculated force, torque, and loss can then be mapped and recovered over the full geometry.

Field solutions can be solved on the partial simulation model and recovered, visualized and further post-processed on the full geometry during post processing.

Data comprising a visualization of at least a portion of the full geometry of the physical object can be transmitted to a remote computing device having an electronic visual display coupled thereto.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1 is a diagram illustrating a plane cut leading to a bad mesh quality in a reduced model;

FIG. 2 is a diagram illustrating a plane cut destroying a clone mesh in a reduced model;

FIG. 20 is a diagram illustrating B fields simulated with a full model and a partial simulation model;

DETAILED DESCRIPTION

Figure 3:
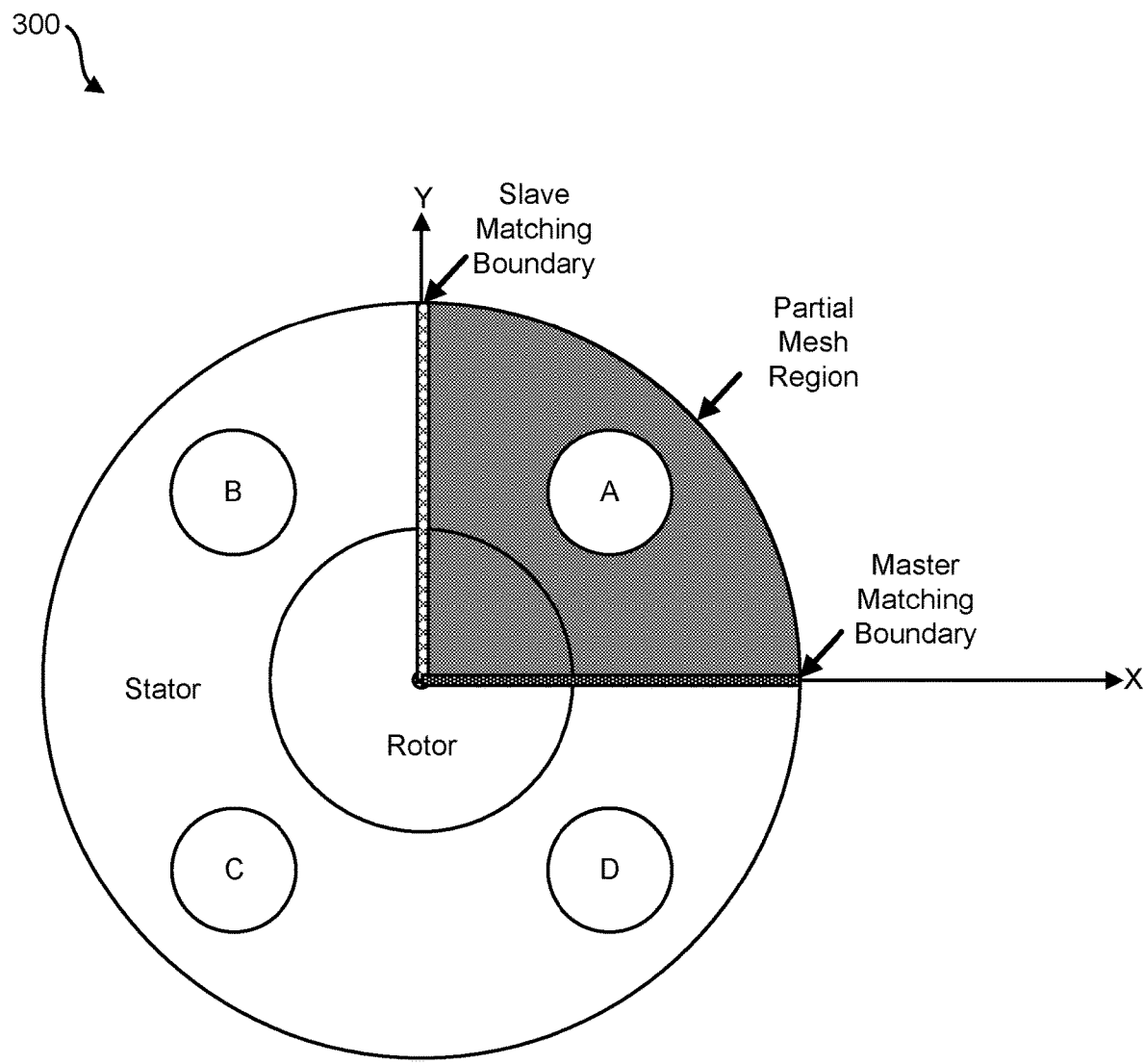
FIG. 3 is a diagram illustrating an example three dimensional model of a rotating machine observed from the top.

The current subject matter is directed to enhanced techniques for transient finite element analysis (FEA) of rotating machines which reduce the solution domain without accuracy loss and with enhanced usability.

From the point of view of a user, it is desirable to deal with an original full physical model (sometimes referred to herein as a full model) because the full physical model is easier to set up. The full model is the original physical model that includes all geometries and sources. In addition, a full physical model can also provide a comprehensive visualization (i.e., visual illustration in a graphical user interface of the objects of interest, etc.) of various field quantities for better understanding of the physics behind the solution results. However, a full physical model simulation is costly in terms of computing resources (e.g., memory, CPU, I/O, etc.).

On the other hand, based on field periodical or anti-periodical condition along circumferential direction, only a fraction of a full physical model (referred to as a reduced model) can be used as the solution domain by applying a planar master/slave matching boundary. A reduced model is a simulation model that is created from the full model by manually cutting the full model with the planar boundary. This boundary is manually cut by the user based on the periodicity of the full model (geometries, sources). The scope of the reduced model is bounded by the planar boundaries. The use of a reduced model can substantially reduce both computation time and hardware consumption. However, at the same time, a reduced model also creates some undesirable side effects. Firstly, a reduced model greatly degrades the usability as a user must decide which portion from the full model is chosen to create the reduced model together with the proper definition of master/slave matching boundary. In addition, the source assignment is no longer straightforward as it involves selecting relevant coils to create windings together with the proper creation of terminals. In addition, the setup required for a reduced model requires a sophisticated user and is also error-prone.

Secondly, a reduced model can have a negative impact on accuracy as the geometry cut by a planar master/slave matching boundary can result in bad and tiny geometry features, which, in turn, can lead to bad mesh quality near the matching boundary as shown in diagrams 100A and 100B of FIG. 1. In addition, a clone mesh (repeatable mesh associated with repeatable geometry) is essential for cogging torque computation as cogging torque is very sensitive to mesh noise. However, the cut by the planar matching boundary makes it impossible to generate clone mesh as shown in diagrams 200A, 200B of FIG. 2, which will increase the simulation error and lead to the failure for cogging torque computation.

Lastly, the use of a reduced model can limit users to visualize field quantities/plots only to part of original full physical model, thus degrade the field processing capability and become less intuitive to understand the physics.

A partial simulation model is a model created from the full model which is created automatically based on the nonplanar master/slave boundary, in order to avoid bad mesh quality and to increase the solution accuracy and enhance the usability.

FIG. 3 is a diagram 300 of an example model to elaborate certain terminologies used herein. In particular, FIG. 3 illustrates a three dimensional (3D) model observed from the top. This model comprises six objects: Rotor, Stator, A, B, C and D. All the objects are invariant along z direction. This model is periodic along the circumferential direction. The model can be divided to four fractions uniformly because of the periodicity of the model. Those four fractions are the same if rotated by integral numbers of 90 degree. In general, let N be the number of fractions a model can be divided to. Fraction angle $$\Theta = \frac{360°}{N}$$

is the angular distance between neighboring fractions. In the above case, the fraction angle is 90 degree. There is no constraint to the shape of the fraction. When solved as a partial simulation model (sometimes referred to as a partial simulation model), simulation is implemented on the partial mesh region as opposed to the full mesh region (as would be in a full model). In such cases, the partial mesh region can be regarded as one fraction of the full model.

As labeled in FIG. 3, there is a partial mesh region with matching boundaries. Though in FIG. 3, the matching boundaries are planar, they are not required to be planar (and are not in most cases). The field on the slave matching boundary should be equal/opposite to the field on the master matching boundary. In the partial simulation model, there are only three objects: Rotor, Stator and A. The Rotor in the partial simulation model is ¼ of the Rotor in the full model, so as the Stator. The objects B, C and D can be regarded as the object A rotating 90 degree, 180 degree and 270 degree around z axis. As A is inside the partial simulation model region, A is referred to as the base object, and B, C and D are referred to herein as the repeated objects. With the current subject matter, operator $\mathcal{R}$ (X, α) is used to denote the operation to rotate X for α degree around z axis (counter clockwise around the origin if observing from the top). For example, in the above case:

$B = \mathcal{R}(A, 90)$ $C = \mathcal{R}(A, 180)$ $D = \mathcal{R}(A, 270)$

In operator $\mathcal{R}$ (X, α), X can be either object or vector.

As the rotor is rotating in the simulation and the mesh of the rotor is rotating with the object, the meshes of the rotor and stator is non conformal on the interface. This interface is called a coupling surface. The field on the rotating side of the coupling surface and the stationary side of the coupling surface should be equal.

Project Setup and Mesh Generation. For usability, a user can just set up a full model. An electrical machine device is normally periodic in all aspects: geometry, material, excitation and so on. The periodic model will result in the periodicity of the solution. Given the user-specified number of fractions, a partial mesh is created. The location of the partial mesh and the location of the matching boundaries will be automatically decided without any user specification. The partial mesh can have a non-planar matching boundary, to avoid any bad planar cuts on the geometry and to ensure good mesh quality near the matching boundary.

Partial simulation model handling based on the partial mesh. Given the partial mesh from the mesh generator, a field solver can cut the full model to the partial simulation model through the following operations:

1. The 3D objects (solid objects) and 2D objects (sheet objects) are removed from the model if they do not have any mesh inside.

2. In some cases, matching boundaries may cut through some objects. For such situations, parts of these objects may be in the partial simulation model domain while other parts are outside of such partial simulation model domain. The solver can remove the outer parts of the objects.

3. A mesh generator can provide mapping vertices, edges and triangles in the partial mesh. The solver can use this information to generate the matching boundaries (master/slave boundaries). The relation of field on the matching boundaries depends on whether the field in one fraction is full period or half period. If the field in one fraction is full period, then the field on the slave boundary should equal to the field on the master boundary. Otherwise the field on the slave boundary is opposite to the field on the master boundary.

4. If viewed from the full model, the source setup (electrical excitation, permanent magnetic) should be the same (or opposite) on all the fractions. For example, to any source winding, if it has terminal on a base sheet (2D base object) in the partial simulation model, it should also have terminal on all the repeated sheet (2D repeated object). All the source setup defined out of the partial simulation model should be removed. For example, all the winding terminals defined on the sheets out of the partial simulation model should be removed from the winding setup.

Figure 4:
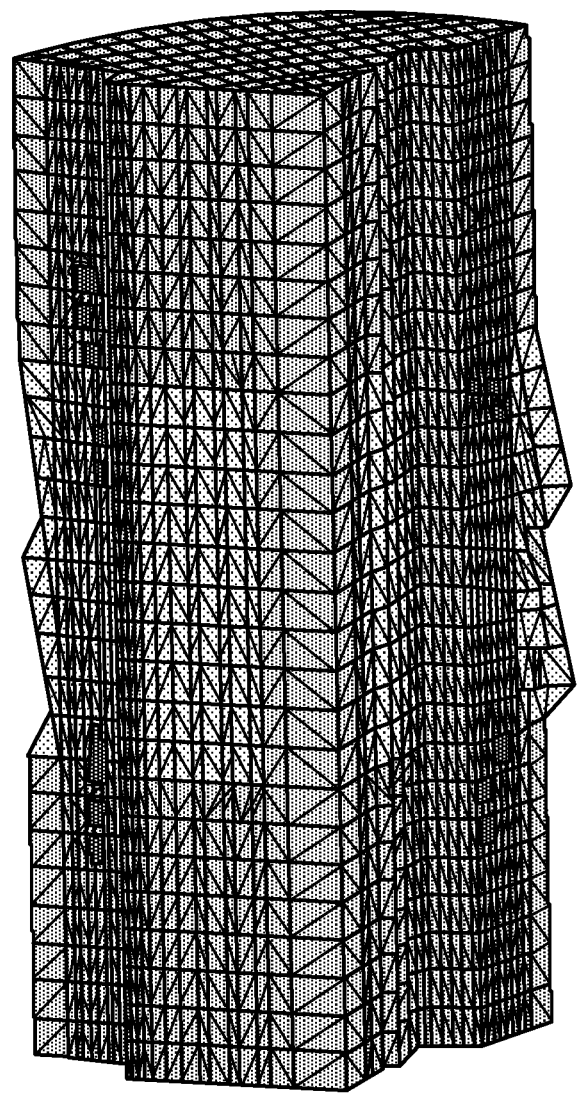
FIG. 4 is a diagram illustrating a partial simulation model with a non-planar matching boundary.

FIG. 4 is a diagram 400 illustrating a partial simulation model with a non-planar matching-boundary. An electrical machine simulation can include the rotational motion setup. The mesh in the rotating region rotates with the geometry. This results in a non-conformal mesh on the coupling surface between rotating region and stationary region. The continuity of the field across the coupling surface should be enforced. To enforce the field's continuity, it is straightforward for the planar matching boundary, but much more complicated for the non-planar matching boundary.

In such a case, the field continuity on the coupling surface is enforced through representing the solution unknowns on the rotating side by the interpolation of the solution unknowns on the stationary side and imbedded this relation to the whole system equations. For T-$\Omega$ formulation used in 3D FEA, the scalar magnetic potential $\Omega$ on the vertexes of the rotating side is represented by the interpolation of $\Omega$ on the stationary side. For the sake of simplicity, take a 2D case as an example as in diagram 500 of FIG. 5.

Figure 5:
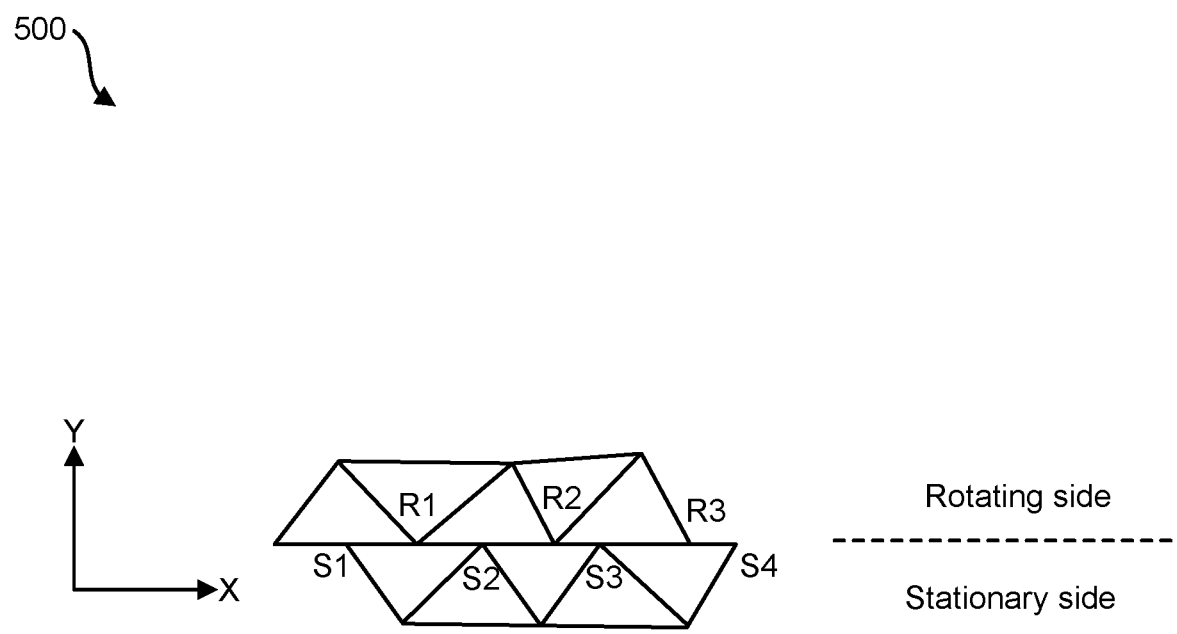
FIG. 5 is a diagram illustrating a non-conformal mesh on a coupling surface.

In FIG. 5, R1, R2, R3 are the vertices on the rotating side of coupling surface, S1, S2, S3, S4 are the vertices on the stationary side of coupling surface, and suppose the coordinate of each node is: S1(1, 0), R1(1.5, 0), S2(2, 0), R2(2.6, 0), S3(3, 0), R3(3.7, 0), S4(4, 0), then there can be the following coupling relationship:

$$\Omega(R1)=\Omega(S1)*0.5+\Omega(S2)*0.5$$

$$\Omega(R2)=\Omega(S2)*0.4+\Omega(S3)*0.6$$

$$\Omega(R3)=\Omega(S3)*0.3+\Omega(S4)*0.7$$

The above equations will be embedded into the whole system equation. With this relationship, the fields in the stationary region and rotating region are continuous across the interface of the two regions. The coupling relationship is enforced to ensure the field continuity across the interface through the shape function.

The above algorithm can be implemented by two steps: a) decouple the mesh on the coupling surface, b) obtain the relationship of field unknowns between rotating side and stationary side.

Step 1: Decouple the mesh on the coupling surface. For traditional planar matching boundaries, for each vertex V, edge E and face F on the coupling surface, a copy for each vertex, edge and face is created (V', E' and F'). For the rotating side, if any vertex, edge and face reside on the coupling surface, they have to be replaced now by the corresponding copied vertex, edge and face (V', E' and F').

Figure 6:
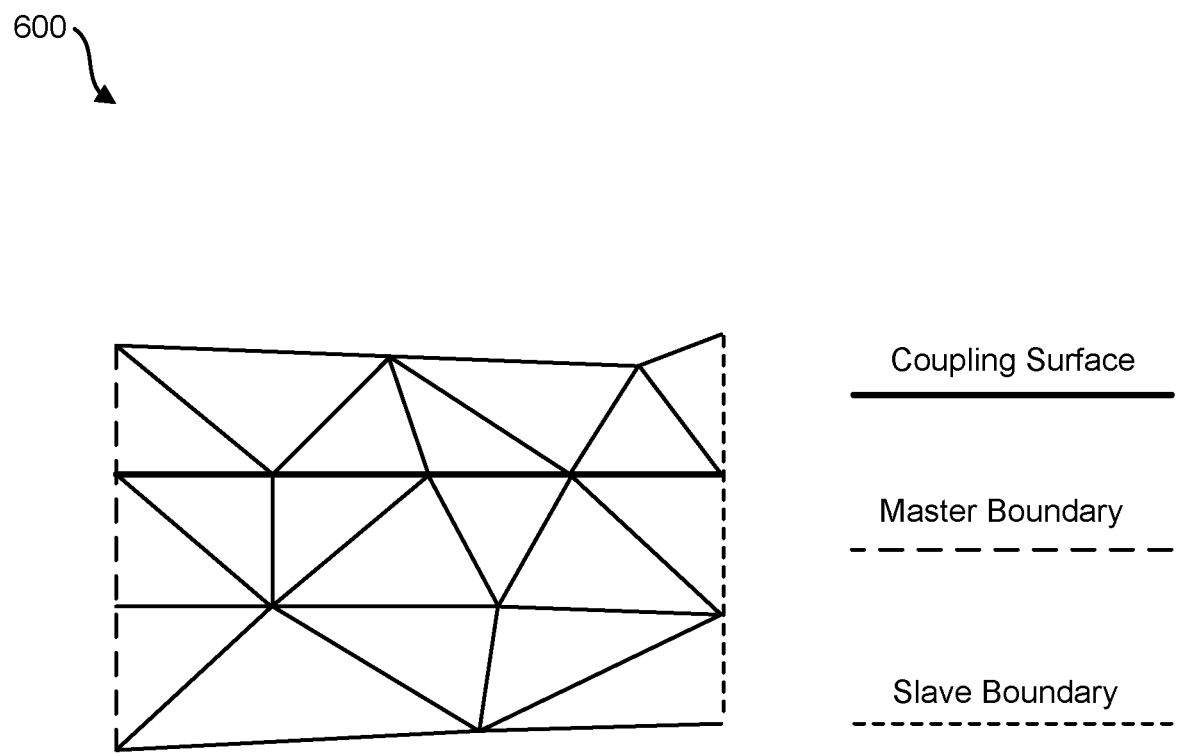
FIG. 6 is a diagram illustrating a mesh before decoupling with planar matching boundaries.
Figure 7:
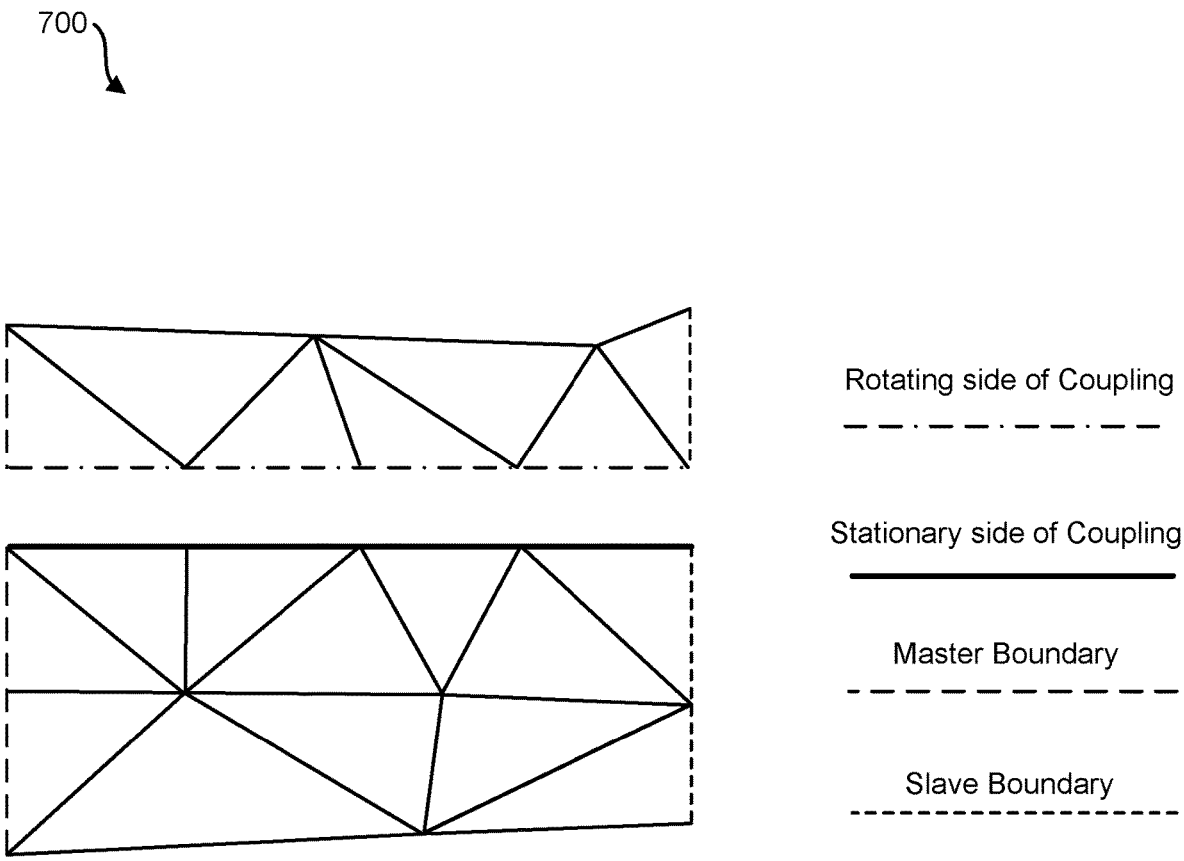
FIG. 7 is a diagram illustrating a mesh after decoupling with planar matching boundaries.
Figure 8:
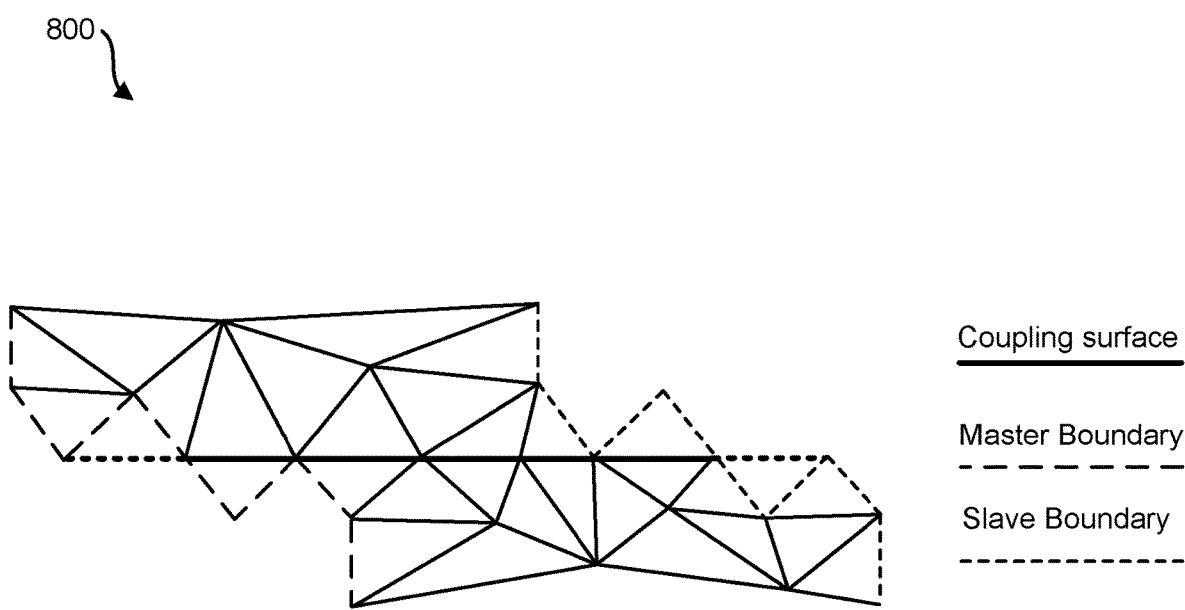
FIG. 8 is a diagram illustrating a mesh before decoupling with non-planar matching boundaries.

FIG. 6 is a diagram 600 illustrating a mesh around the coupling surface before decoupling. FIG. 7 is a diagram 700 illustrating new meshes which are formed after decoupling the original meshes and reconnecting them. With reference to diagram 800 of FIG. 8, when the matching boundaries are non-planar, additional steps are required (with the dashed lines representing a moving coupling interface out of the partial mesh).

Figure 9:
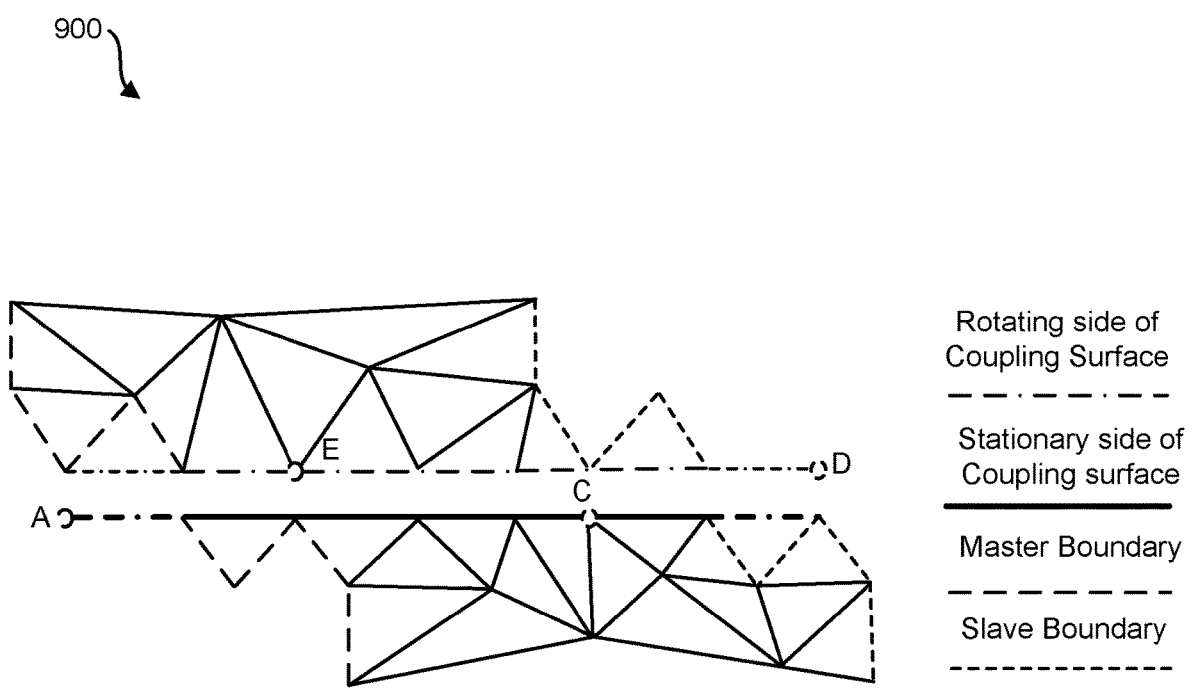
FIG. 9 is a diagram illustrating a mesh that is no longer valid after decoupling with non-planar matching boundaries.

After the meshes are decoupled, there are two issues in the decoupled meshes as illustrated in diagram 900 of FIG. 9. In particular, in the rotating mesh and stationary mesh, there are two floating nodes (A and D) which do not attach to any meshes. Such floating nodes (A and D) are out of the reduced model region defined by the matching boundaries. It happens because when the matching boundary is non-planar; there exist some nodes which are only attached to the rotating mesh or stationary mesh. In such case, if this node is still copied, then after the decoupling, one of the original or copied node will not attach to any mesh. If the original node is only attached to the stationary mesh, then the copied node (such as D) will not attach to any mesh. If the original node is only attached to the rotating mesh, then the original node (such as A) will not attach to any mesh either.

To any floating node (A or D), the matching node of it on the matching boundaries (C is matching node of A, E is matching node of D) should not belong to the matching boundaries anymore as shown in FIG. 9.

To solve the problem with a non-planar matching boundary, after the rotating meshes and the stationary meshes are decoupled, four additional steps are needed:

i) Initialize all the nodes/edges by labeling it as "not included".

ii) Loop through all the mesh elements (triangle in 2D and tetrahedra in 3D) associated with the partial simulation model, label all the nodes/edges attached to the mesh elements as "included". In the above example, node A and D will not be labeled as "included" because A and D are not attached to any mesh element.

iii) Loop through all the nodes/edges in the meshes, remove all the nodes/edges which are still labeled as "not included". Those removed nodes/edges are floating nodes/edges (such as A and D).

(iv) To all the nodes/edges on the matching boundary, if the matching nodes/edges of them are floating and removed, those nodes/edges (E and C) should be removed from the matching boundary pair.

Figure 10:
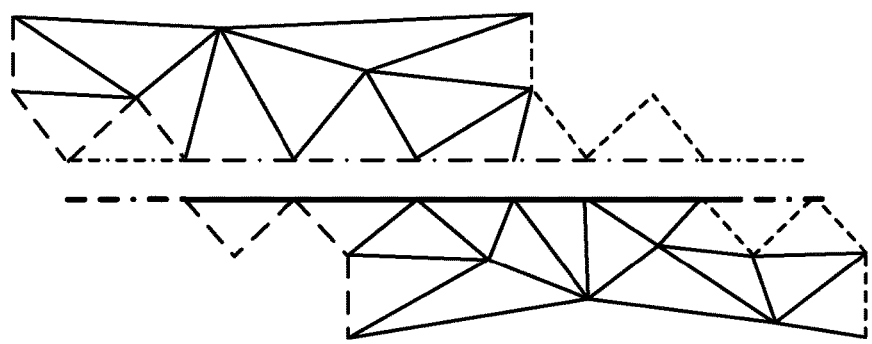
FIG. 10 is a diagram illustrating a valid mesh after decoupling with non-planar matching boundaries.

After applying the above operations, the resulting mesh topology will be as illustrated in diagram 1000 of FIG. 10.

Step 2: Establish the coupling relationship of field unknowns between the rotating side and the stationary side. Establishing in this regard, refers to defining or otherwise specifying the coupling relationship. In particular, establishing includes calculating the relationship of the vertex in the rotating mesh with the face element in stationary mesh (as described in more detail below) and enforcing the relationship in terms of shape function (which is by calculation).

At each time step with a different position on the rotating part, all the vertices on the rotating side of the coupling surface are initially gone through. For each vertex V' on the rotating side, search for the relevant face element F (triangle for tetrahedra element) on the stationary side which this vertex V' will be mapped to. Then the scalar potential $\Omega(V')$ at the vertex V' is represented by interpolating $\Omega$ in terms of shape function for face F.

Figure 11:
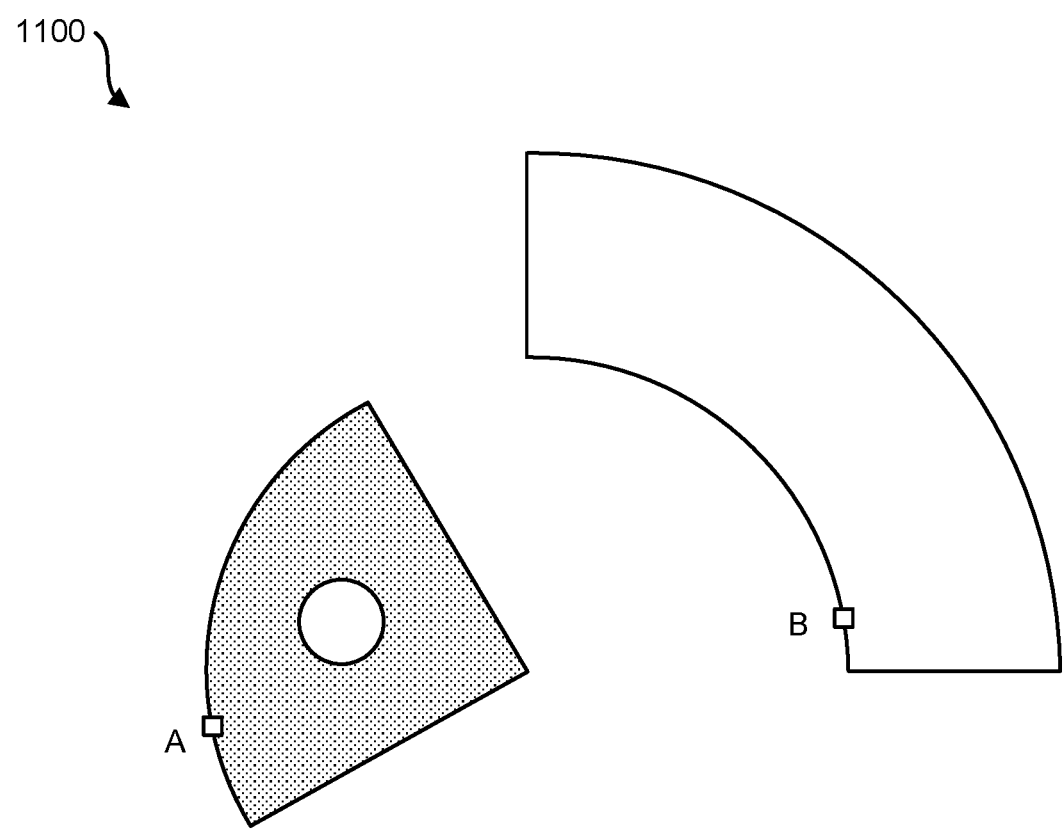
FIG. 11 is a diagram illustrating a two dimensional partial simulation model.

When search for the face element F which a vertex V' will be mapped to, it may happen that the vertex V' could not find any face element F. This happens, for example, in the model shown in diagram 1100 of FIG. 11, the partial simulation model is in the range [0, 90] degree. Any vertex V' in the range [90, 360] degree cannot be mapped to the stationary mesh directly. In such case, this vertex V' need to be rotated by multiple of a fraction angle $\alpha$ (90 degree in this example) so that vertex V' is in the range [0, 90] degree. For example, vertex V' is at the location A (190 degree). It needs to be rotated with 2 fraction angle ($2\alpha$=180 degree) to location B (10 degree) so it can be mapped to the stationary mesh directly.

Figure 12:
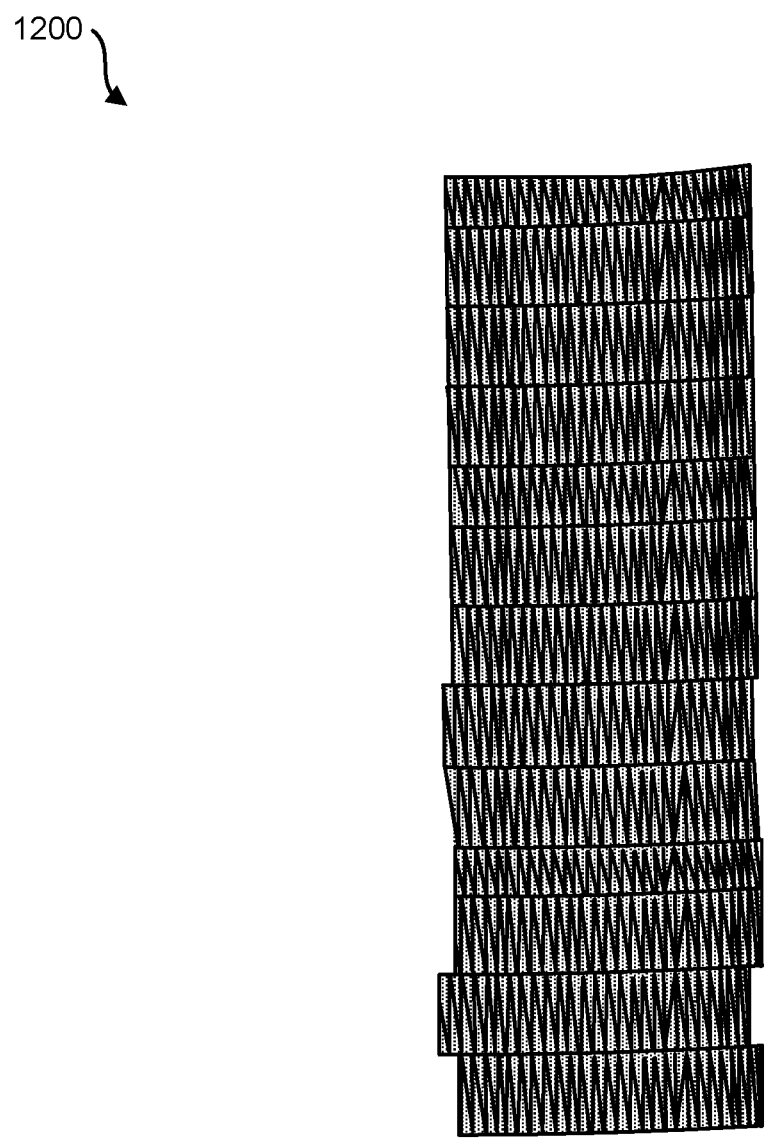
FIG. 12 is a diagram illustrating a mesh on a coupling surface with non-planar matching boundaries.

This step can be realized for planar matching boundary because the stationary mesh is in a predefined range ([0,90] degree in this example) so it is easy to calculate the angle by which the vertex V' need to rotate. But this is no longer valid for non-planar matching boundary. In such a case, the stationary side surface mesh of the coupling surface is not in a predefined range as shown in diagram 1200 of FIG. 12. Therefore, it is difficult to determine how many fraction angles the vertex V' need to be rotated.

To solve this issue, the following three steps are provided:

i) Choose any node on the master boundary as the reference node and calculate the estimated angular range of the stationary mesh based on this reference node. If the reference node at the location $\beta$, the range will be [$\beta,\alpha+\beta$]. For example, to the case in FIG. 11, it is assumed that the reference node is at the location 2 degree. Then the range will be [2, 92] degree. As this is only a rough estimation of the range of the stationary mesh, some mesh might be out of the range. On the other hand, at some location in the range, there is no corresponding mesh. Therefore, it is possible that the element F could not be found after the Vertex V' is rotated to the range [$\beta,\alpha+\beta$], As a result, the following two steps are further introduced.

ii) Rotate the vertex V' with some integral number of fraction angle $\alpha$ so that the vertex V' is moved to this range. Search for the surface element F (triangle for tetrahedra element) which vertex V' at the new location can be mapped to. If the surface element can be found, then use this element, otherwise go to step iii.

iii) Rotate the vertex V' to the two neighboring ranges [$\beta,\alpha+\beta$] and [$\beta+\alpha,\beta+2\alpha$]. Surface element should be found in one of these two ranges.

Solve the field with the partial simulation model. After the linear system equation is established, the system equation is solved directly or iteratively.

Force calculation with the user setup in the full model. Due to a user setting up the force computation based on the full model, the user may select an object which is out of the partial simulation model for force calculation. In such a case, the software needs to first identify the corresponding object in partial simulation model based on the periodicity and then conduct certain transformation to get the solution. For example, when simulating in the partial simulation model as shown in diagram 1300 of FIG. 13, the user can choose to calculate the force on object A directly. But if the user wants to calculate the force on object B, the software needs to calculate the force on object A at first, then rotate the force 90 degrees counterclockwise to get the force on object B.

Figure 13:
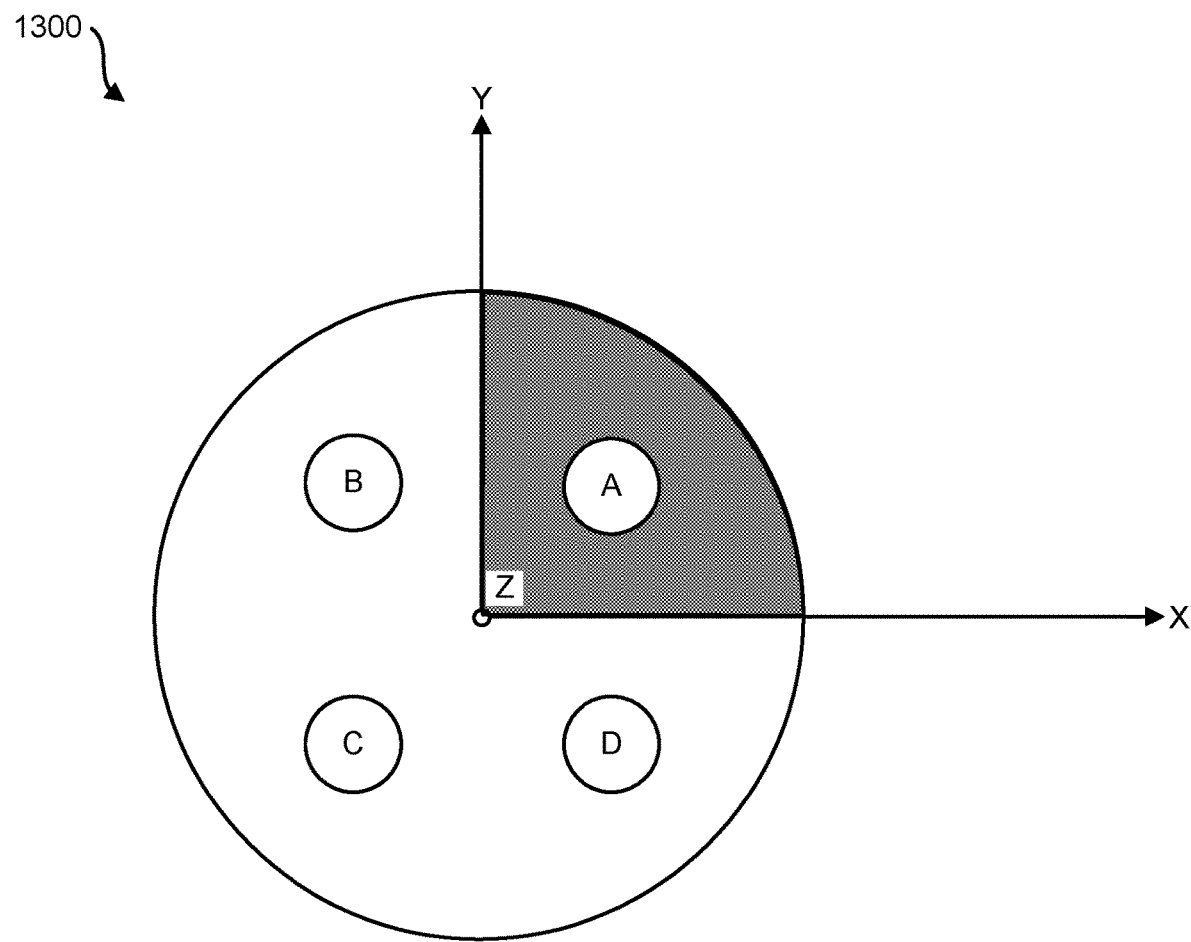
FIG. 13 is a diagram illustrating a ninety degrees partial simulation model.

For the sake of the explanation the following notation can be used:

F(X): The force on object X $F_p(X)$: The force on the overlap of object X and partial simulation model (this is the force of X if it is calculated in the partial simulation model). In the example of FIG. 13, only $F_p(A)$ is nonzero.

$\mathcal{R}$ (F,b): the vector results from rotating the vector F b degree around the z axis (counter clockwise around the origin if observing from the top).

With the above notation, in the above example:

$$F(A)=F_p(A)$$

$$F(B)=\mathcal{R}(F_p(A),90)$$

$$F(C)=\mathcal{R}(F_p(A),180)$$

$$F(D)=\mathcal{R}(F_p(A),270)$$

Figure 14:
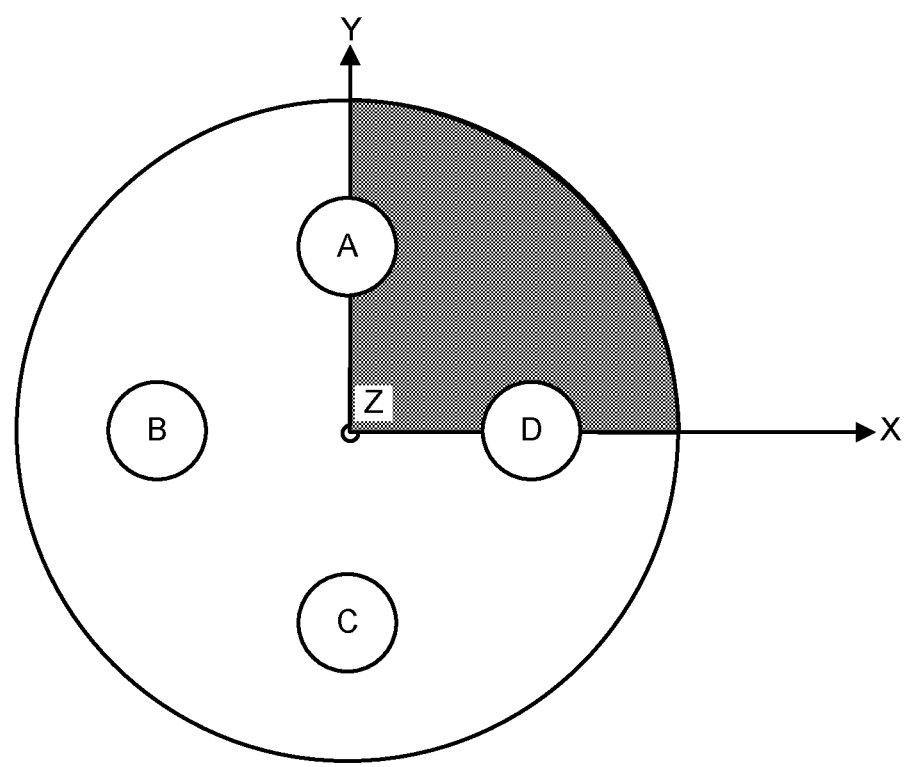
FIG. 14 is a diagram illustrating a ninety degrees partial simulation model where objects touch matching boundaries.

In another example, the objects touching the matching boundary are illustrated in diagram 1400 of FIG. 14.

In all these cases, the matching boundaries are planar. But all the observation and algorithm also work for the non-planar matching boundaries.

For the example shown in FIG. 14:

$$F(A)=\mathcal{R}(F_p(A),0)+\mathcal{R}(F_p(D),90)$$

$$F(B)=\mathcal{R}(F_p(A),90)+\mathcal{R}(F_p(D),180)$$

$$F(C)=\mathcal{R}(F_p(A),180)+\mathcal{R}(F_p(D),270)$$

$$F(D)=\mathcal{R}(F_p(A),270)+\mathcal{R}(F_p(D),0)$$

Figure 15:
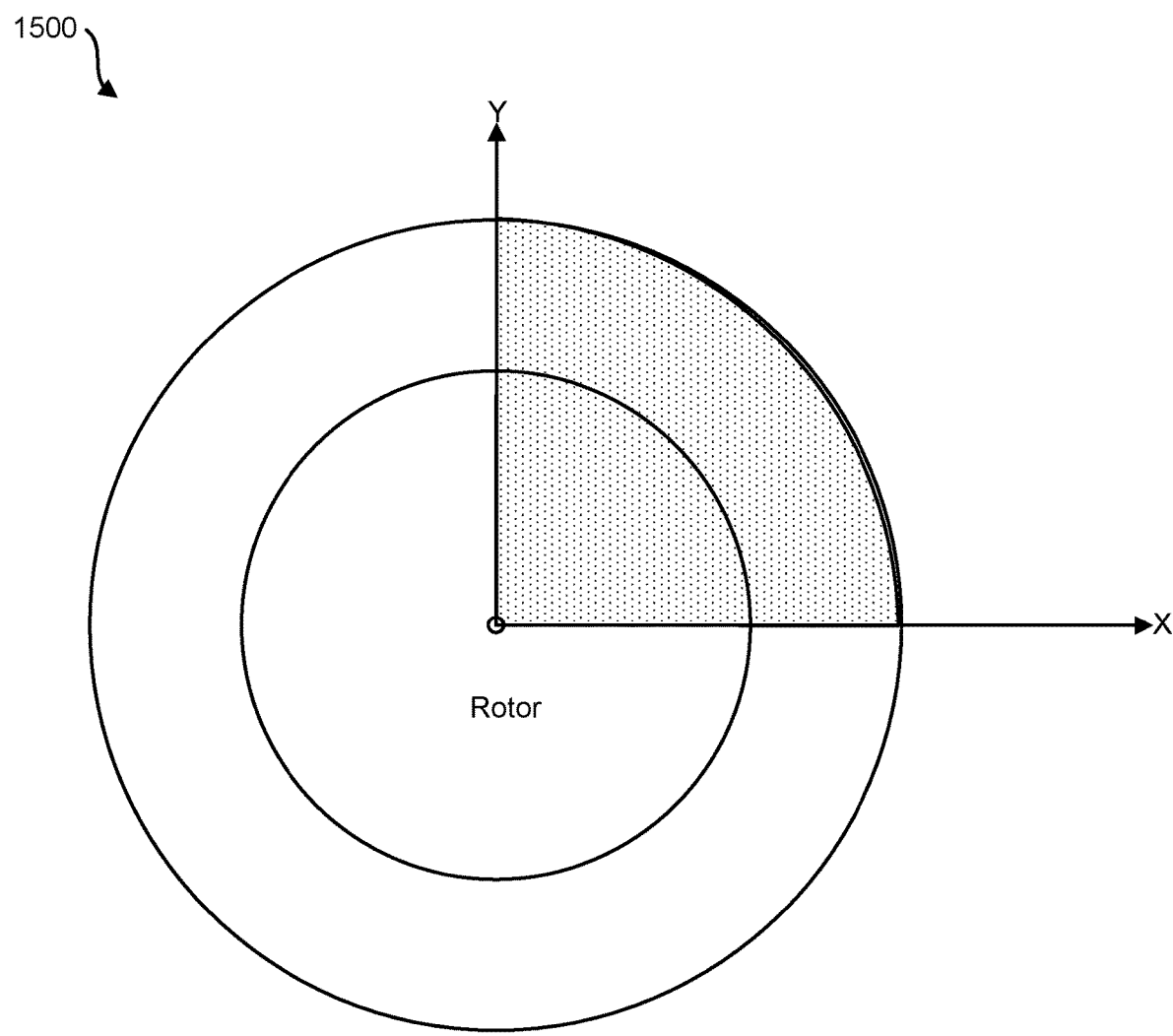
FIG. 15 is a diagram illustrating an example rotor.

In the case of a rotor shown in diagram 1500 of FIG. 15:

$$F(\text{Rotor})=\mathcal{R}(F_p(\text{Rotor}),0)+\mathcal{R}(F_p(\text{Rotor}),90)+\mathcal{R}(F_p(\text{Rotor}),180)+\mathcal{R}(F_p(\text{Rotor}),270)$$

Sometimes, the transformation can be more complicated. For example, in the periodic model shown in diagram 1600 of FIG. 16, one fraction has 15 degrees in the circumferential direction. There are 24 rectangle objects uniformly distributed around z axis. In all 24 rectangle objects, only objects B, C, D and E exist in the partial simulation model.

Figure 16:
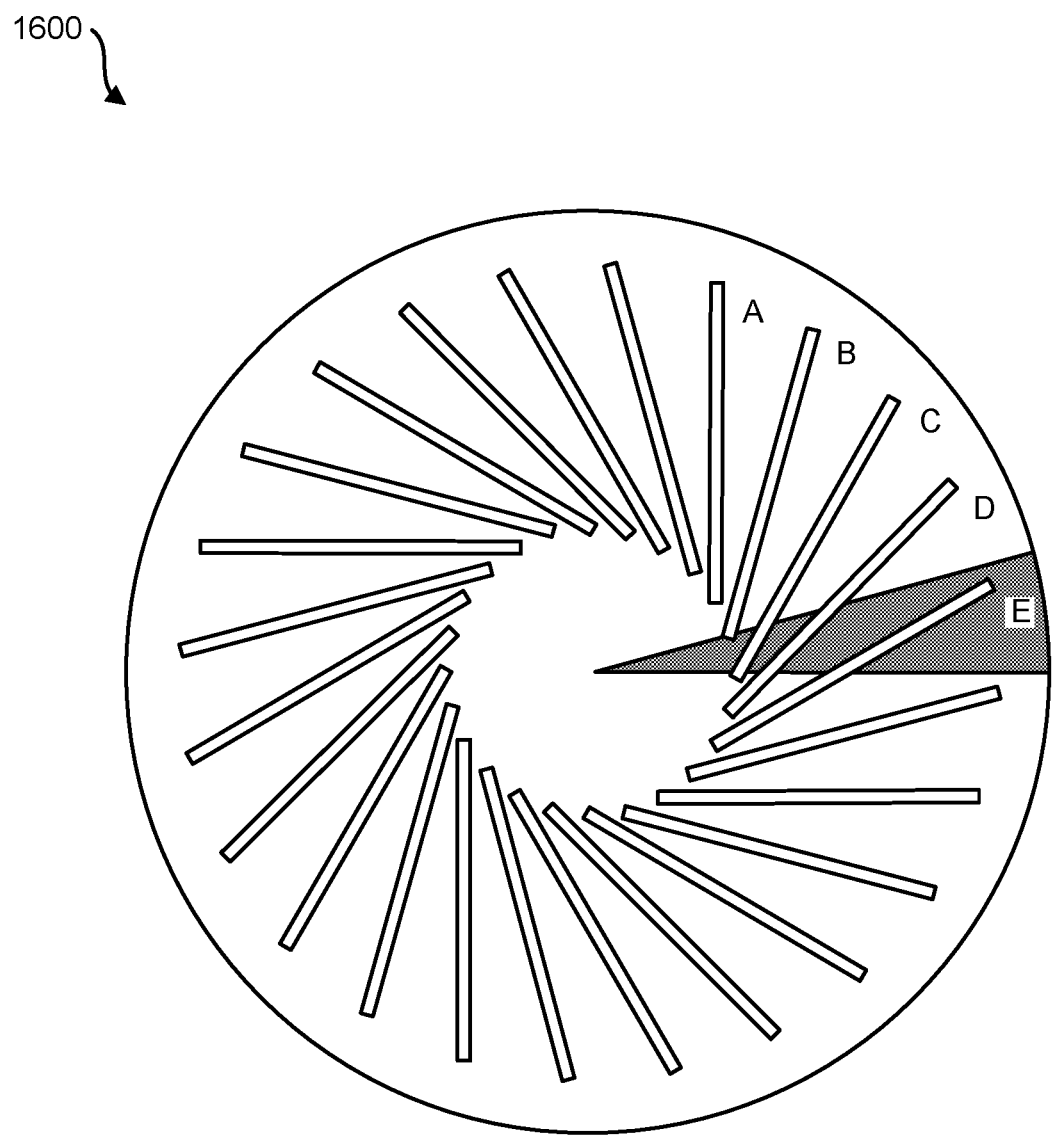
FIG. 16 is a diagram of a fifteen degrees partial simulation model.

It is easy to observe that in this example of FIG. 16, only $F_p(B)$, $F_p(C)$, $F_p(D)$, $F_p(E)$ are nonzero. In order to recover the force on the object A from the partial solution, the formula below can be used:

$$F(A)=\mathcal{R}(F_p(B),15)+\mathcal{R}(F_p(C),30)+\mathcal{R}(F_p(D),45)+\mathcal{R}(F_p(E),60)$$

Therefore, it can be observed that the general requirements to recover the force in the original full model based on the partial simulation model solution are the following:

1) It must be able to handle all possible cases automatically without user involvement.
2) It should properly take the periodicity of the solution into account. For example, in the example shown in FIG. 13, only one $F_p(A)$ is needed to calculate all F(A), F(B), F(C), F(D). Also, in rotor case shown in FIG. 15, torque of rotor is only calculated in partial simulation model region as $F_p$(Rotor)

To satisfy the above requirement, the following algorithm can be implemented:
1) Solver will use the information of the location relation of the objects provided by mesh generator. Assuming the original full model can be divided into N fractions, then the objects can be divided to two categories:
   a) There are N objects with the same geometry and being separated from each other by 360/N degree. The objects A, B, C, D shown in FIG. 13 belongs to this category.
   b) One object crosses all the N fractions. The object Rotor in FIG. 15 belongs to this category.

If the project is periodic, all the 3D and 2D objects belong to either one of these two categories. Then all the objects can be grouped in the following way. For the objects in category a, each group has N objects, while for the objects in category b, each group has only one object. Any object can only belong to one group.

The mesh generator will send the locational relation of the objects group by group. For each group in category a, all N objects in one group will be sent in counter clockwise order.

The solver can use a two-dimension array Obj[m][n] to store this information. Subscript m denotes the group number, and Obj[m] is used to store the N objects in one group. If the object belongs to category b (only one object in the group), Obj[m] is still with size N and each Obj[m][n] store the same object.

For the example of FIG. 13 and FIG. 14, the Obj element related to Object A, B, C, D can be Obj[m]={A,B,C,D}

For the example of FIG. 15, the Obj element related to Object Rotor is

Obj[m]={Rotor,Rotor,Rotor,Rotor}

Given the meshes, the solver can check whether there is any mesh in one object and store this information in another two-dimension array E[m][n]. Here E[m][n]=1 means there is mesh in Object Obj[m][n], E[m][n]=0 means there is no mesh in Object Obj[m][n].

For the example of FIG. 13, the Obj[m][n] is defined as above, then

E[m]={1,0,0,0}

For the example of FIG. 14, the Obj[m][n] is defined as above, then

E[m]{1,0,0,1}

For the example of FIG. 15, the Obj[m][n] is defined as above, then

E[m]={1,1,1,1}

Given two arrays Obj[m][n] and E[m][n], to calculate the force on the object X, at first search for the group number m and index j so that Obj[m][j]=X. When force of X is calculated:

$$F(X) = \sum_{i=0}^{N-1} \mathcal{R}\left(F_p(Obj[m][i])E[m][i], (j-i)\frac{360}{N}\right)$$

Obviously, $F_p$(Obj[m][i]) are only calculated when E[m][i]=1.

The current techniques can handle all of these possible cases.

Any calculated force $F_p$ are stored for further usage. In this way, if the user chooses to calculate the force on any objects which, in terms of periodicity, can be recovered based on the calculated force inside the partial simulation model, the solver does not need to calculate it again. In the example of FIG. 13, if F(A) as already been calculated, $F_p(A)$ is stored. Then the calculation of F(B), F(C) and F(D) are very minimum. In the example of FIG. 15, the force calculation of the whole rotor F(rotor) can be reduced to the force calculation of the rotor in the partial simulation model $F_p$(rotor).

Recover full model field solutions and visualization from partial simulation model solutions. Recovery, in this regard, relates to the process of obtaining full model field solutions from partial simulation model solutions, for example, for visualization or post processing. In particular, recovering means that the partial field calculated in the partial simulation model is mapped to the full model based on the periodic/antiperiodic and symmetric properties of the full model. For the sake of better description, a couple of notations are introduced. Let N be the number of circumferential fractions and define $$\Theta = \frac{360°}{N}.$$

Thus, the full model could be considered as consisting of N domains $\mathcal{D}_i$, where $0 \leq i < N$ and $\mathcal{D}_i = \mathcal{R}(\mathcal{D}_0, i*\Theta)$, that is, domains $\mathcal{D}_i$ can be derived by rotating base domain $\mathcal{D}_0$ by the angle of $i*\Theta$. Field solutions on each domain can be constructed through transformations from field solutions in the partial simulation model.

As fields in one section can be periodic or half periodic, there may be a need to reverse directions in the local Z direction for the transformations to vector fields. Hence, separate transformations can be provided for coordinates, vector fields and opposite direction vector fields, which can be denoted as $T_c$, $T_v$ and $T_{ov}$ respectively. Let's further assume that there is a local CS for the circumferential fractions where the full model is formed by rotating the partial simulation model around its Z axis. Let $T_r$ be the relative transformation between this relative CS and the global CS, $T_f[N]$ be the local transformations for the NC circumferential fractions, the transformations for coordinates, vector fields and opposite vector fields can be calculated with the following pseudocode:

```
for (i = 0; i < N; ++i)
{
    if (ii % 2 == 1)
    {
        lT_c = T_f[i]
        lT_v = T_f[i]
        if (flipPositionLocalZ)
        {
            lT_c[2][2] = -1
```

-continued

```
}
if (reverseVectorDirection)
{
    IT_v[0][0] =— IT_v[0][0]
    IT_v[0][1] =— IT_v[0][1]
    IT_v[1][0] =— IT_v[1][0]
    IT_v[1][1] =— IT_v[1][1]
    if (flipPositionLocalZ == false)
    {
        IT_v[2][2] =— 1
    }
}
T_c[i] = T_r^-1 × IT_c × T_r
T_v[i] = T_r^-1 × IT_v × T_r
}
else
{
    T_c[i] = T_r^-1 × T_f[i] × T_r
    T_v[i] = T_r^-1 × T_f[i] × T_r
}
T_ov[i] = T_v[i]
}
```

As mentioned in the previous section the mesh generator will provide the relationship of the locations between the objects. With this relationship, the full model geometry can be constructed from the partial simulation model by rotations of multiples of $\Theta$. Based on the information of body and face mapping, which is available from partial mesh, each body mapping line consists of N body IDs, $id_0$, $id_1$, ... $id_{NC-1}$, followed by N flags, where $id_i = \mathcal{R}$ ($id_0$, $i*\Theta$) and the flags indicate whether the corresponding body is meshed in the partial simulation model. It follows that all bodies can be classified into the corresponding domains with the following pseudocode:

```
for (i=0; i<N; ++i)
{
    if (meshed[i])
    {
        for (j=0; j<N; ++j)
        {
            n=ids[(i+j) % N];
            n belongs to domain j;
        }
    }
}
```

Application Example. The following example is used to demonstrate the effectiveness of this invention capability.

Figure 17:
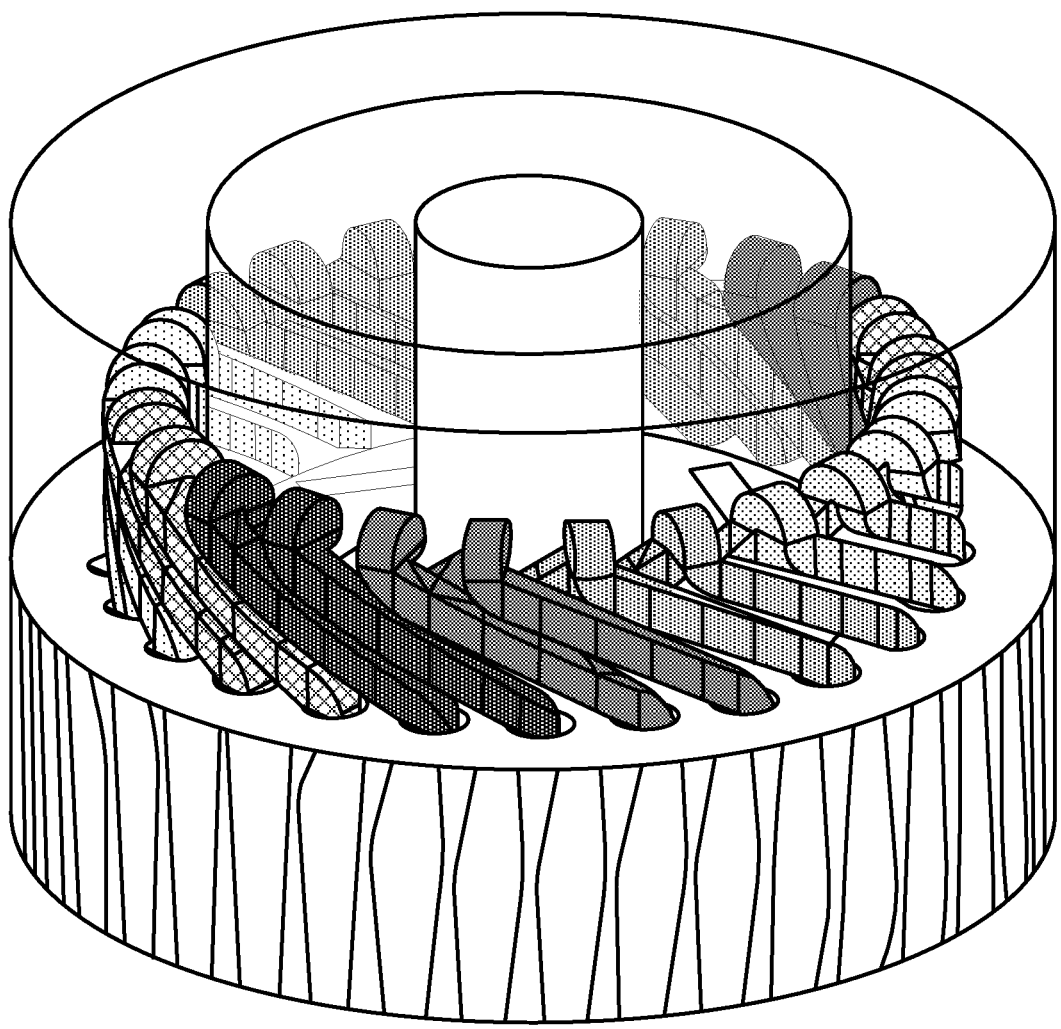
FIG. 17 is a diagram illustrating a full geometry of an electrical machine.

This is an interior permanent magnet motor as shown in diagram 1700 of FIG. 17. The geometry creation and all setup steps are performed in full 360 degree circumferentially and at the same time based on symmetry along axial direction, only half of the original physical model is required to further save computation time. To validate the correctness of solutions derived from partial model, full model solutions can be used as the reference to compare with partial model solutions.

Figure 18:
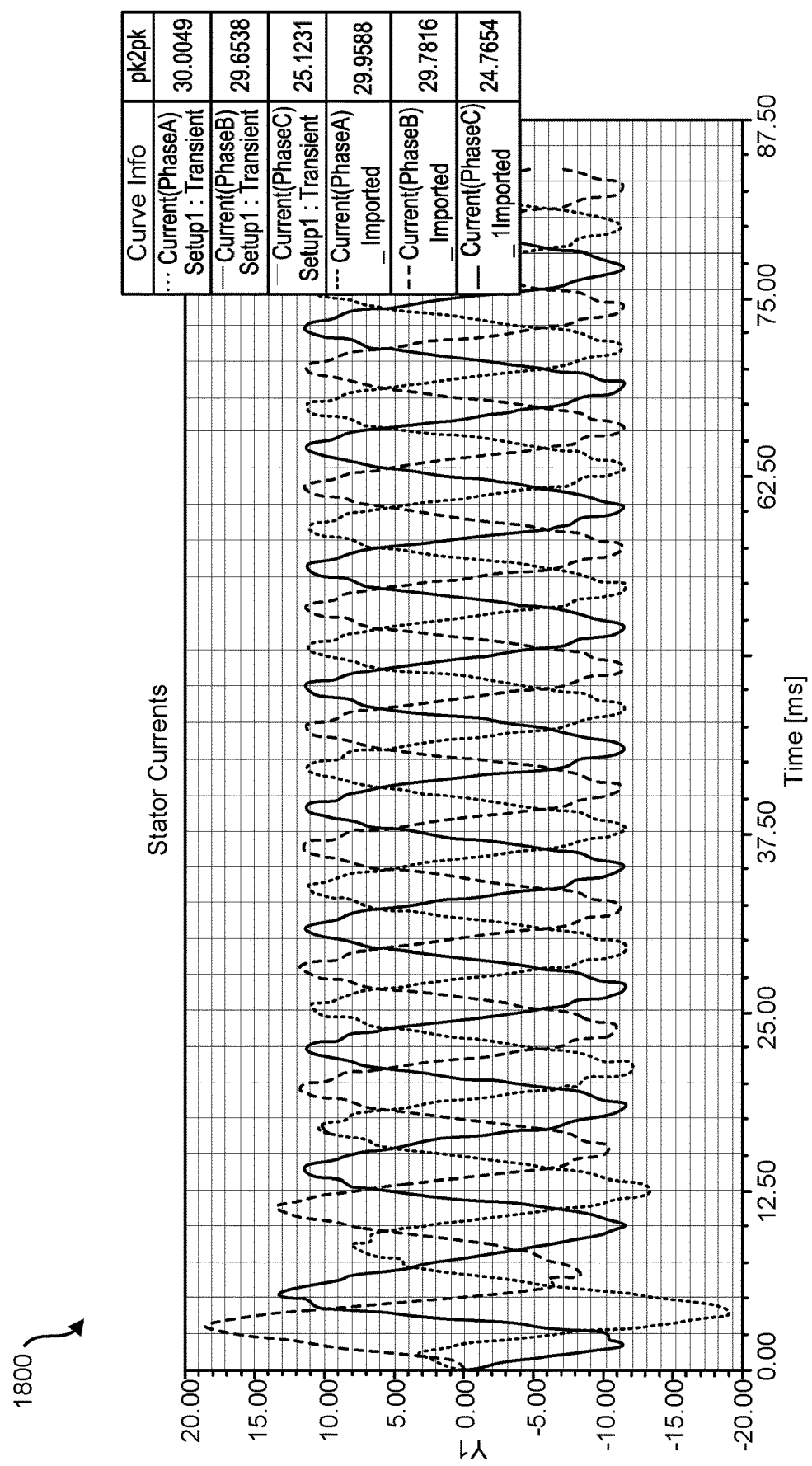
FIG. 18 is a diagram illustrating waveforms of three phase currents in which solid lines represent a full model solution and dashed lines represent a partial simulation model solution.
Figure 19:
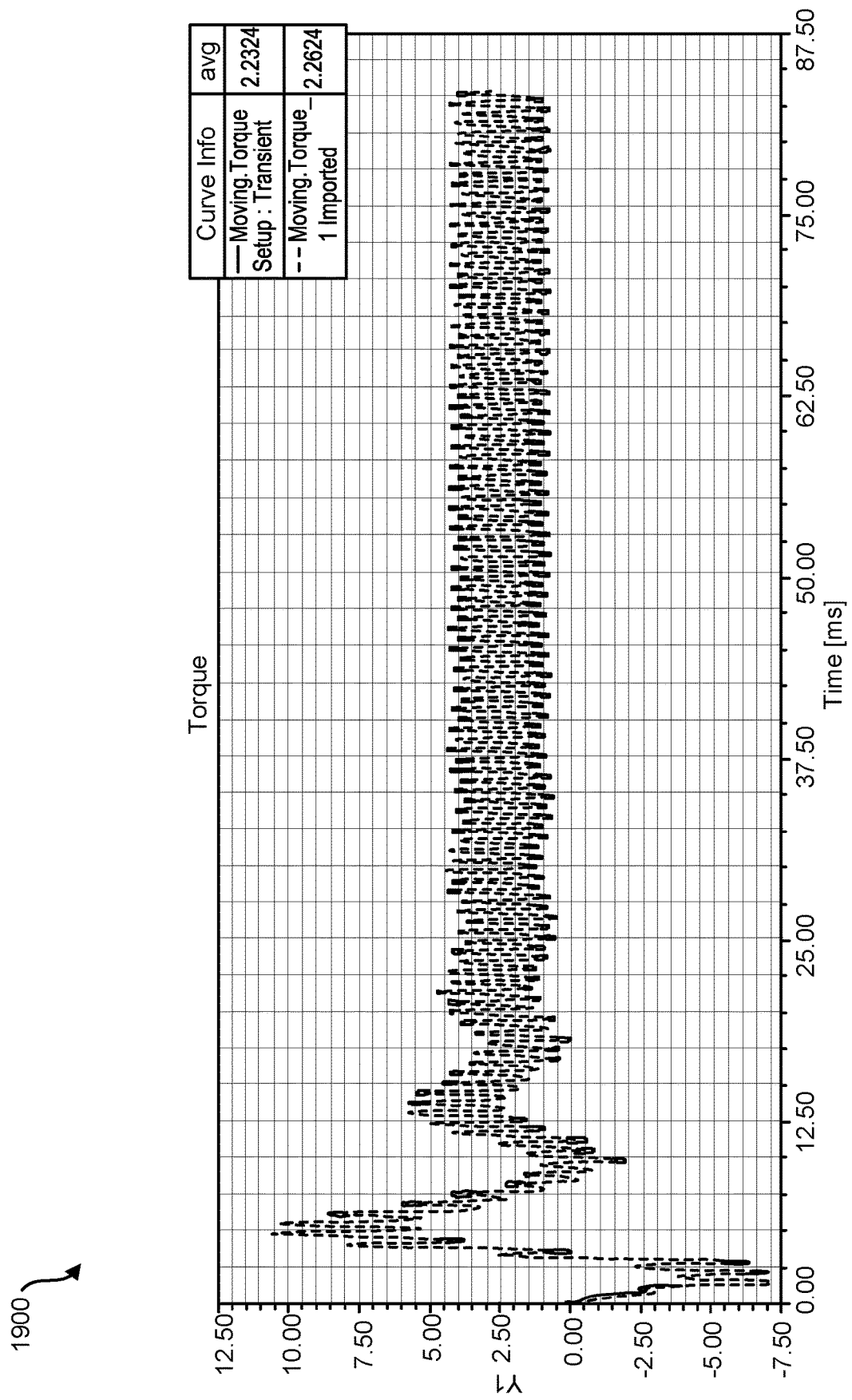
FIG. 19 is a diagram illustrating waveforms of torques in which solid lines represent a full model solution and dashed lines represent a partial simulation model solution.

It can be observed that both currents (diagram 1800 of FIG. 18) and torques (diagram 1900 of FIG. 19) of two simulations match extremely well. The flux density B field plots of the two simulation at the middle plane along axial direction are shown in diagram 2000 of FIG. 20 which are also visibly the same.

Table 1 shows the comparison of CPU time and memory usage between the partial simulation model simulation and full model simulation with the use of 10 cores. It can be seen that significant reduction of computation time is achieved.

TABLE 1

|  | Full Model | Partial simulation model |
|---|---|---|
| # of tetrahedral | 136518 | 36379 |
| CPU Time | 41 hours, 11 minutes | 8 hours, 24 minutes |
| Memory Usage | 4.17 G | 1.17 G |

Figure 21:
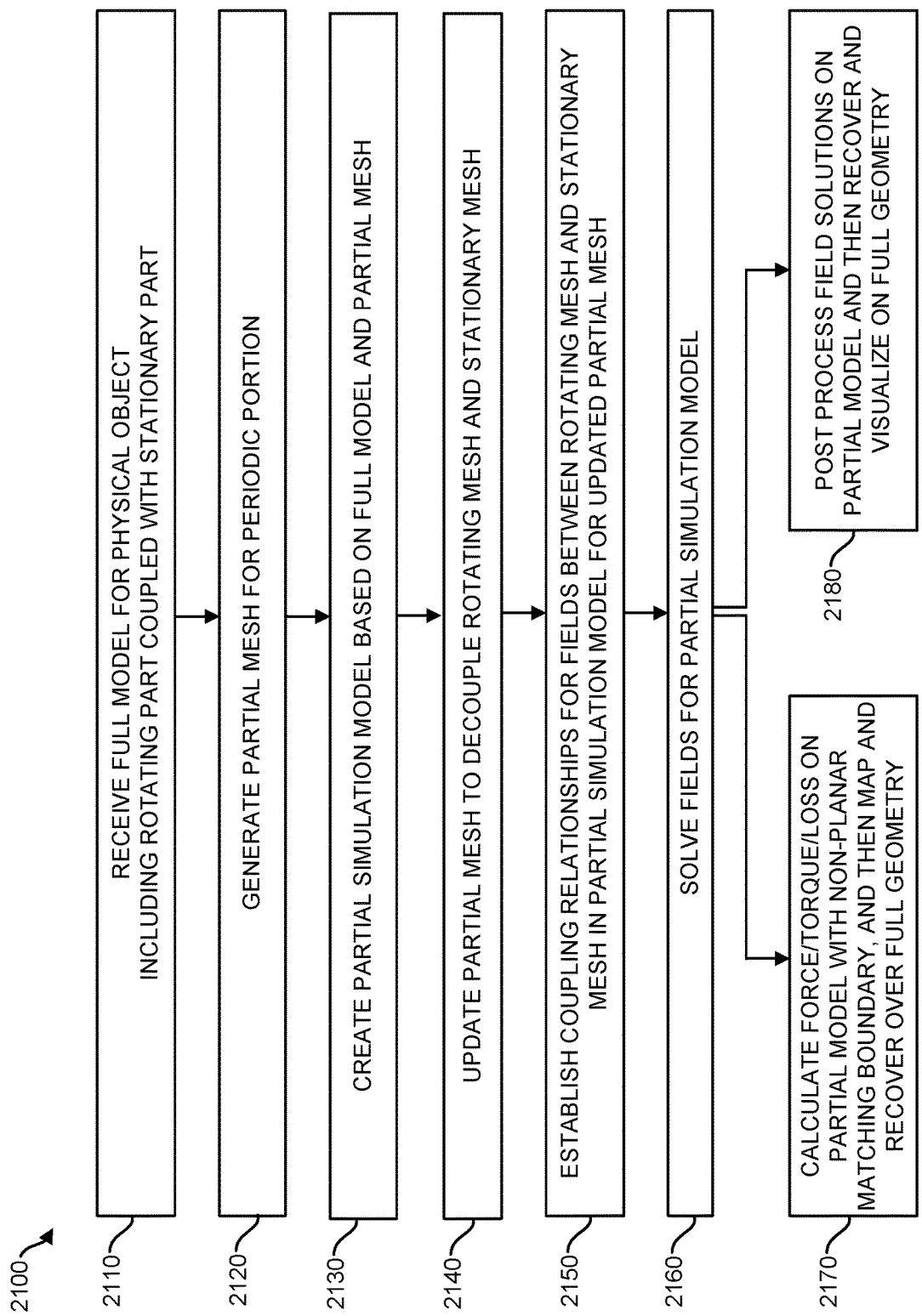
FIG. 21 is a first process flow diagram illustrating auto-partial simulation model creation, simulation and post-processing for rotational machines.

FIG. 21 is a process flow diagram 2100 in which, at 2110, data is received that encapsulates a full model for a physical object including a rotating part coupled with a stationary part. The physical object includes a periodic portion. Thereafter, at 2120, a partial mesh is generated for the periodic option. The partial mesh has non-planar matching boundaries and can include a rotating mesh corresponding to the rotating portion and a stationary mesh corresponding to the stationary part. A partial simulation model is then created, at 2130, which is based on the full model and the partial mesh. In such an arrangement, the 2D and 3D objects belonging to the periodic portion in the full model are identified. Based on this identification, the partial simulation model includes the 2D and 3D objects to represent winding elements in the partial simulation model. The partial mesh is then updated, at 2140, to decouple the rotating mesh and the stationary mesh. Once the decoupling has been completed, at 2150, coupling relationships for fields between the rotating mesh and the stationary mesh can be established in the partial simulation model for the updated partial mesh. Next, at 2160, fields can be solved for the partial simulation model. Based on the solving, at 2170, the force/torque/loss on the partial simulation model can be calculated with the non-planar matching boundary, and then mapped and recovered over the full geometry. In addition, at 2180, field solutions can be post-processed on the partial simulation model and then recovered and visualized on the full geometry.

Figure 22:
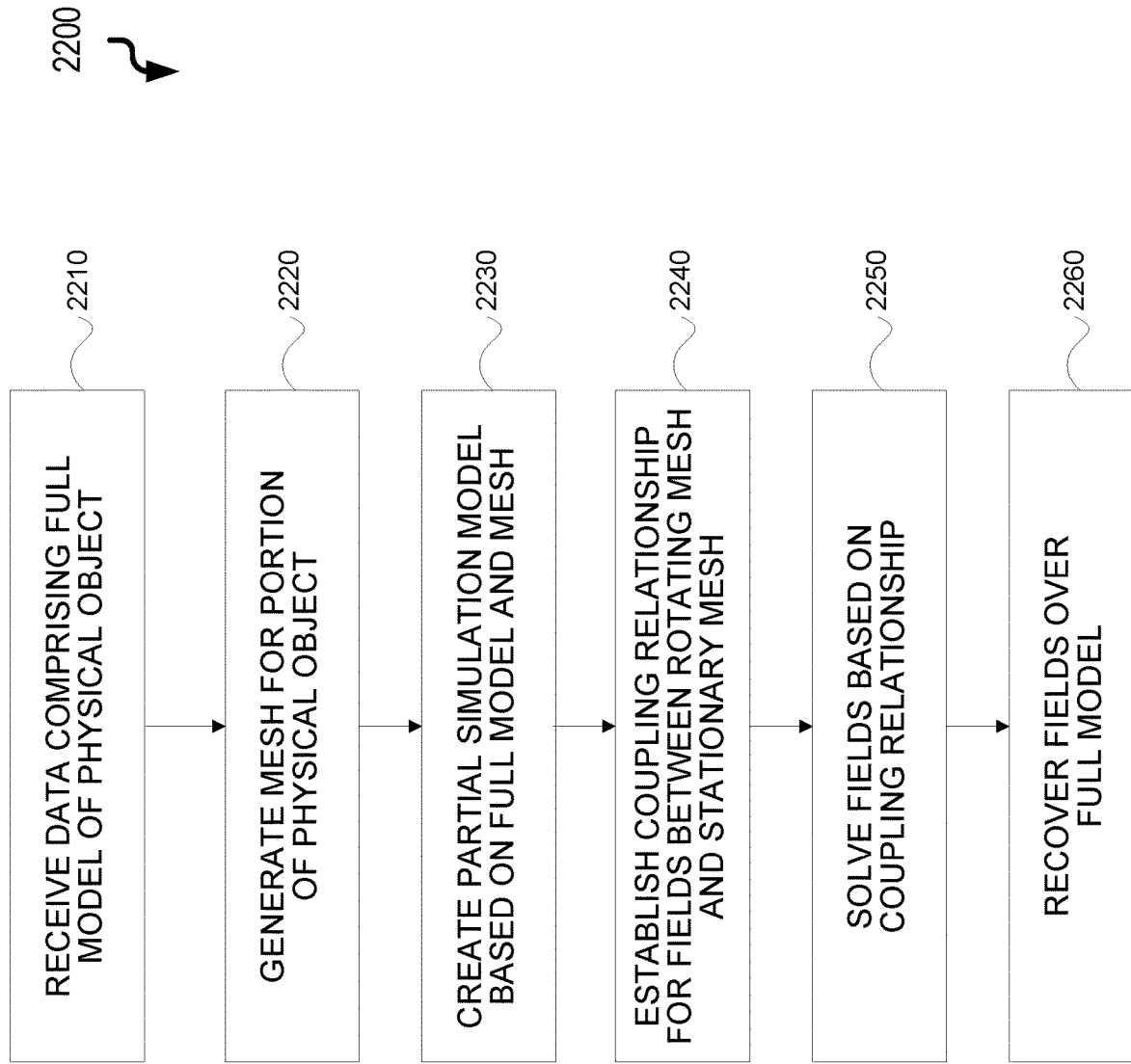
FIG. 22 is a second process flow diagram illustrating auto-partial simulation model creation, simulation and post-processing for rotational machines.

FIG. 22 is a process flow diagram 2200 showing a variation to that process of FIG. 21 in which, at 2210, data is received that comprises a full model for a physical object having a rotating part and a stationary part. The physical object includes fields coupled between the rotating part and the stationary part. Thereafter, at 2220, a mesh is generated for a portion of the physical object that includes a rotating mesh and a stationary mesh. Next, at 2230, a partial simulation model is generated based on the full model and the mesh. Coupling relationships can then be established (i.e., defined), at 2240, for the fields between the rotating mesh and the stationary mesh in the partial simulation model. The fields are then solved, at 2250, based on the coupling relationship of the partial simulation model. Next, at 2260, fields of the full model are recovered. Recovery, in this regard, can be used for visualization in a graphical user interface or further post processing based on the solved fields. Post processing can include calculations based on the field such as calculating some other physically quantity from the field. One example is calculating the permeability of the material from the B field and H field by the formula $$\mu = \frac{B}{H}.$$

Post processing can also include integration/differentiation of the field. An example of integration/differentiation is calculating the loss on one geometry by integrating the loss density on such geometry. In addition, calculating can include plotting the field on the user defined object such as one plane, one line and so on. Those planes or lines are not defined in the partial simulation model. One example is that plotting the field on x-y plane (z=0 plane).

Figure 23:
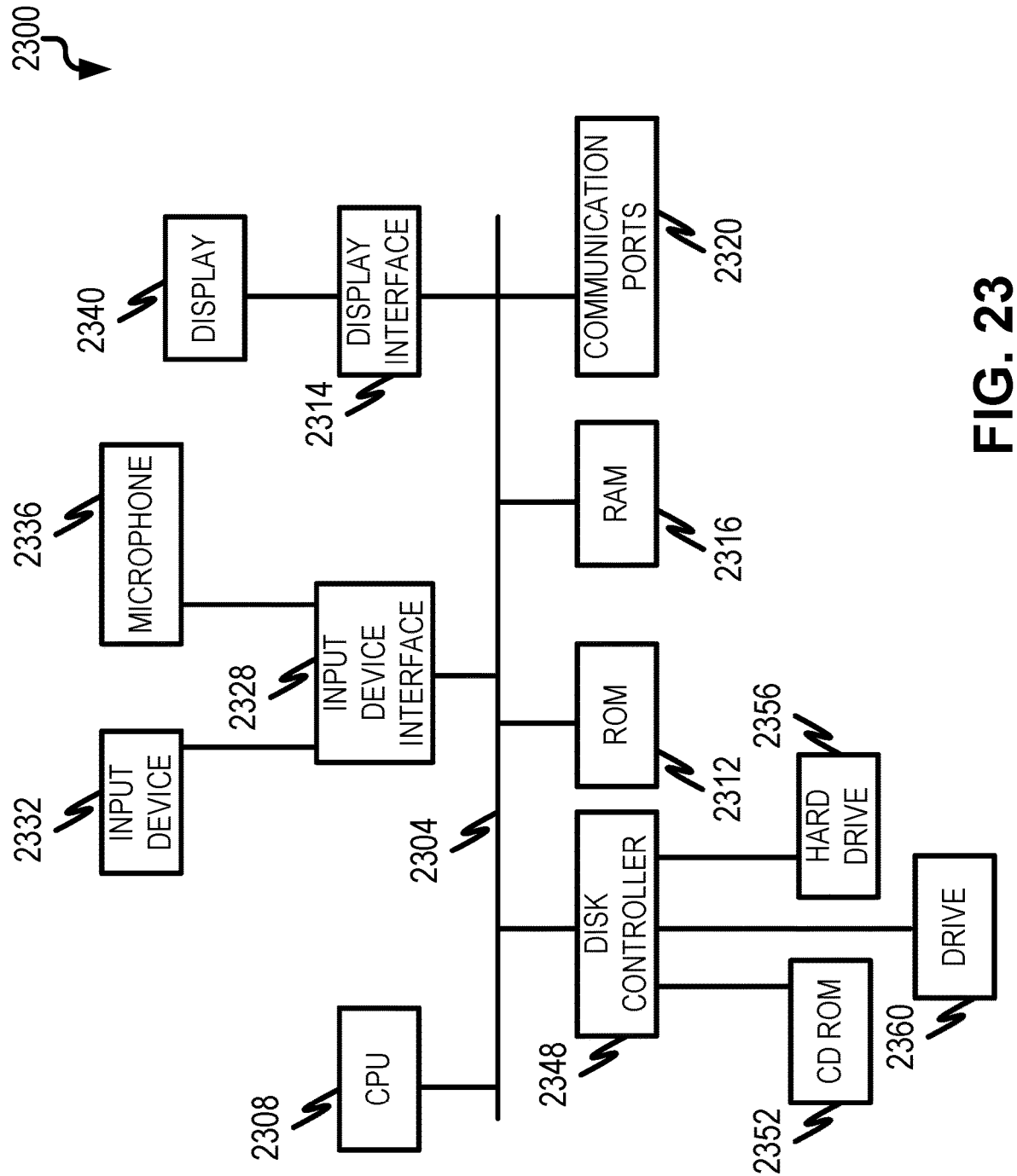
FIG. 23 is a diagram of a computing device for implementing aspects of the current subject matter.

FIG. 23 is a diagram 2300 illustrating a sample computing device architecture for implementing various aspects described herein. A bus 2304 can serve as the information highway interconnecting the other illustrated components of the hardware. A processing system 2308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 2312 and random access memory (RAM) 2316, can be in communication with the processing system 2308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 2348 can interface with one or more optional disk drives to the system bus 2304. These disk drives can be external or internal floppy disk drives such as 2360, external or internal CD-ROM, CD-R, CD-RW or DVD, or solid state drives such as 2352, or external or internal hard drives 2356. As indicated previously, these various disk drives 2352, 2356, 2360 and disk controllers are optional devices. The system bus 2304 can also include at least one communication port 2320 to allow for communication with external devices either physically connected to the computing system or available externally through a wired or wireless network. In some cases, the at least one communication port 2320 includes or otherwise comprises a network interface.

To provide for interaction with a user, the subject matter described herein can be implemented on a computing device having a display device 2340 (e.g., a CRT (cathode ray tube) or LCD (liquid crystal display) monitor) for displaying information obtained from the bus 2304 via a display interface 2314 to the user and an input device 2332 such as keyboard and/or a pointing device (e.g., a mouse or a trackball) and/or a touchscreen by which the user can provide input to the computer. Other kinds of input devices 2332 can be used to provide for interaction with a user as well; for example, feedback provided to the user can be any form of sensory feedback (e.g., visual feedback, auditory feedback by way of a microphone 2336, or tactile feedback); and input from the user can be received in any form, including acoustic, speech, or tactile input. The input device 2332 and the microphone 2336 can be coupled to and convey information via the bus 2304 by way of an input device interface 2328. Other computing devices, such as dedicated servers, can omit one or more of the display 2340 and display interface 2314, the input device 2332, the microphone 2336, and input device interface 2328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying FIGs. and/or described herein do not necessarily require the particular order shown, or sequential order, to achieve desirable results. Other implementations may be within the scope of the following claims.

What is claimed is:

1. A computer-implemented method comprising:
receiving data comprising a full model for a physical object having a rotating part and a stationary part, the physical object including fields coupled between the rotating part and the stationary part;
obtaining an integer number indicating two or more fractions of the full model, each fraction of the full model being uniform;
generating a mesh for a fraction of the full model, the mesh including a rotating mesh and a stationary mesh having non-planar matching boundaries with floating nodes outside the boundaries;
creating a partial simulation model based on the full model and the mesh in which the floating nodes outside the boundaries are removed;
establishing coupling relationships for partial fields between portions of the physical object represented by the rotating mesh and the stationary mesh in the partial simulation model;
solving the partial fields based on the coupling relationships of the partial simulation model; and
simulating the fields based on the partial fields, wherein fields over any geometry of the full model are recovered from the partial fields for visualization or further post processing in a graphical user interface.

2. The method of claim 1, wherein the mesh is a partial mesh.

3. The method of claim 2, wherein the partial mesh comprises non-planar matching boundaries.

4. The method of claim 3, wherein the full model comprises a periodic portion.

5. The method of claim 4, wherein creating the partial simulation model comprises: identifying two dimensional and three dimensional objects in the periodic portion in the full model.

6. The method of claim 5, wherein the identified two dimensional and three dimensional objects represent winding elements in the partial simulation model.

7. The method of claim 6 further comprising: modifying the partial simulation model to decouple the rotating mesh and the stationary mesh prior to establishing of the coupling relationships for the fields; wherein: the floating nodes are removed after decoupling the rotating mesh and the stationary mesh; and the coupling relationships are established based on the modified partial simulation model.

8. The method of claim 7 further comprising: calculating force, torque, and loss on the modified partial simulation model with a non-planar matching boundary; and mapping and recovering the calculated force, torque, and loss over a full geometry of the full model.

9. The method of claim 8 further comprising: recovering fields on the full model from fields solved on the partial simulation model; and post processing and visualizing field solutions on the full model.

10. The method of claim 1 further comprising: transmitting data comprising a visualization of at least a portion of a full geometry of the full model of the physical object to a remote computing device having an electronic visual display coupled thereto.

11. A system comprising:
at least one data processor; and
memory comprising instructions which, when executed by the at least one data processor, result in operations comprising:
receiving data comprising a full model for a physical object having a rotating part and a stationary part, the physical object including fields coupled between the rotating part and the stationary part;
obtaining an integer number indicating two or more fractions of the full model, each fraction of the full model being uniform;
generating a mesh for a fraction of the full model, the mesh including a rotating mesh and a stationary mesh having non-planar matching boundaries with floating nodes outside the boundaries;
creating a partial simulation model based on the full model and the mesh in which the floating nodes outside the boundaries are removed;
establishing coupling relationships for partial fields between portions of the physical object represented by the rotating mesh and the stationary mesh in the partial simulation model;
solving the partial fields based on the coupling relationships of the partial simulation model; and
simulating the fields based on the partial fields, wherein fields over any geometry of the full model are recovered from the partial fields for visualization or further post processing in a graphical user interface.

12. The system of claim 11, wherein the mesh is a partial mesh.

13. The system of claim 12, wherein the partial mesh comprises non-planar matching boundaries.

14. The system of claim 13, wherein the full model comprises a periodic portion.

15. The system of claim 14, wherein creating the partial simulation model comprises: identifying two dimensional and three dimensional objects in the periodic portion in the full model.

16. The system of claim 15, wherein the identified two dimensional and three dimensional objects represent winding elements in the partial simulation model.

17. The system of claim 16, wherein the operations further comprise:
modifying the partial simulation model to decouple the rotating mesh and the stationary mesh prior to establishing of the coupling relationships for the fields; wherein:
the floating nodes are removed after decoupling the rotating mesh and the stationary mesh; and
the coupling relationships are established based on the modified partial simulation model.

18. The system of claim 17, wherein the operations further comprise:
calculating force, torque, and loss on the modified partial simulation model with a non-planar matching boundary; and
mapping and recovering the calculated force, torque, and loss over a full geometry of the full model.

19. The system of claim 18, wherein the operations further comprise:
post processing field solutions on the partial simulation model; recovering fields of the geometry of the full model from the partial simulation model; and
visualizing the partial simulation model on a full geometry of the full model.

20. A non-transitory computer program product comprising instructions which, when executed by at least one computing device, result in operations comprising:
- receiving data comprising a full model for a physical object having a rotating part and a stationary part, the physical object including fields coupled between the rotating part and the stationary part;
- obtaining an integer number indicating two or more fractions of the full model, each fraction of the full model being uniform;
- generating a mesh for a fraction of the full model, the mesh including a rotating mesh and a stationary mesh;
- creating a partial simulation model based on the full model and the mesh by decoupling the rotating mesh from the stationary mesh and removing any floating nodes outside of a non-planar matching boundary;
- establishing coupling relationships for partial fields between portions of the physical object represented by the rotating mesh and the stationary mesh in the partial simulation model;
- solving the partial fields based on the coupling relationships of the partial simulation model; and
- simulating the fields based on the partial fields, wherein fields over any geometry of the full model are recovered from the partial fields for visualization or further post processing in a graphical user interface.

* * * * *